US010745878B2

United States Patent
Reedijk et al.

(10) Patent No.: US 10,745,878 B2
(45) Date of Patent: Aug. 18, 2020

(54) COVER ELEMENT OF CONCRETE FOR A BREAKWATER OR JETTY CONSTRUCTION, AS WELL AS BREAKWATER OR JETTY CONSTRUCTION PROVIDED WITH A PLURALITY OF SUCH ELEMENTS

(71) Applicant: KONINKLIJKE BAM GROEP N.V., Bunnik (NL)

(72) Inventors: Jan Sebastiaan Reedijk, Gouda (NL); Robert Pieter Michaël Jacobs, Utrecht (NL); Pieter Bastiaan Bakker, Nieuwerkerk Aan Den Ijssel (NL)

(73) Assignee: KONINKLIJKE BAM GROEP N.V., Bunnik (NL)

( * ) Notice: Subject to any disclaimer, the term of this patent is extended or adjusted under 35 U.S.C. 154(b) by 0 days.

(21) Appl. No.: 16/333,089

(22) PCT Filed: Sep. 14, 2017

(86) PCT No.: PCT/NL2017/050603
§ 371 (c)(1),
(2) Date: Mar. 13, 2019

(87) PCT Pub. No.: WO2018/052292
PCT Pub. Date: Mar. 22, 2018

(65) Prior Publication Data
US 2019/0271128 A1 Sep. 5, 2019

(30) Foreign Application Priority Data
Sep. 14, 2016 (NL) ...................................... 2017461

(51) Int. Cl.
*E02B 3/14* (2006.01)
*E02B 3/12* (2006.01)

(52) U.S. Cl.
CPC ................ *E02B 3/129* (2013.01); *E02B 3/14* (2013.01); *Y02A 10/15* (2018.01)

(58) Field of Classification Search
CPC ... E02B 3/129; E02B 3/12; E02B 3/14; E02B 3/06
(Continued)

(56) References Cited

U.S. PATENT DOCUMENTS

| 3,614,866 A | 10/1971 | Kaneko et al. |
| 7,160,057 B2 * | 1/2007 | Reedijk ................. B28B 7/0029 405/25 |
| 8,132,985 B2 | 3/2012 | Melby et al. |

FOREIGN PATENT DOCUMENTS

| EP | 1165894 B1 | 2/2003 |
| FR | 1148412 A | 12/1957 |

(Continued)

OTHER PUBLICATIONS

International Search Report and Written Opinion, dated Jan. 18, 2018, from corresponding PCT application No. PCT/NL2017/050603.

*Primary Examiner* — Sean D Andrish
(74) *Attorney, Agent, or Firm* — Young & Thompson

(57) ABSTRACT

Disclosed is a concrete cover element for a breakwater or jetty construction. The cover element includes a plate portion and two noses. The plate portion lies in the xy-plane and has a thickness. The two noses project in opposite directions from the plate portion and form a single part with the plate portion. The plate portion is to be imagined as being formed from a quadrangular plate whose two opposite plate edges are incised in the middle to form a plate recess, and whose corners located on the first plate diagonal are both cut off along a first secant. The plate portion has a first dimension measured along the first plate diagonal and a second dimen- (Continued)

sion measured along the second plate diagonal. The first dimension is smaller than the second dimension.

14 Claims, 16 Drawing Sheets

(58) Field of Classification Search
USPC .......................................................... 405/29
See application file for complete search history.

(56) References Cited

FOREIGN PATENT DOCUMENTS

| | | | |
|---|---|---|---|
| JP | S48-10989 Y1 | | 3/1973 |
| JP | 57130613 | * | 8/1982 |
| JP | S57-130613 A | | 8/1982 |
| WO | 2004/009910 A2 | | 1/2004 |
| WO | 2008/115617 A2 | | 9/2008 |

* cited by examiner

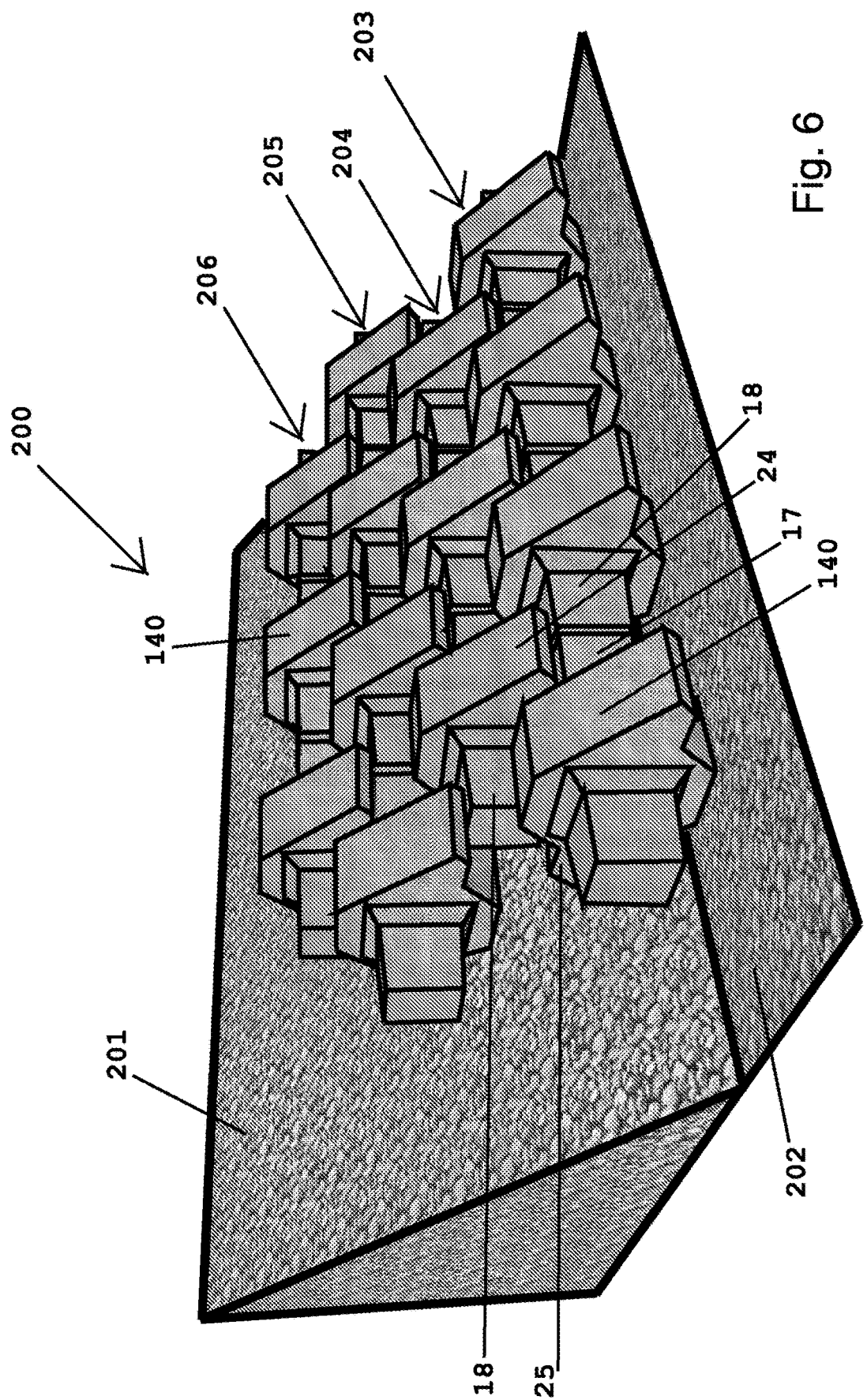

COVER ELEMENT OF CONCRETE FOR A BREAKWATER OR JETTY CONSTRUCTION, AS WELL AS BREAKWATER OR JETTY CONSTRUCTION PROVIDED WITH A PLURALITY OF SUCH ELEMENTS

BACKGROUND OF THE INVENTION

Field of the Invention

The present invention relates to a concrete cover element for a breakwater or jetty construction, such as a slope. The cover element comprises a plate portion with a nose projecting from the plate portion on one side of the plate and a nose projecting in the opposite direction on the other opposite side of the plate. The present invention moreover relates to a jetty/breakwater construction, such as a slope or breakwater, comprising a plurality of cover elements according to the invention.

Description of the Related Art

Such a cover element for a breakwater or jetty construction is known from WO-2004/009910, EP-1,165,894 and U.S. Pat. No. 3,614,866, among others.

The plate portion in these known cover elements is X-shaped or H-shaped, with protrusions from the central section of the X/H-shape in the form of four legs and two noses. The four legs extend in the direction of the plate portion and together with the central section form the plate portion and determine the X-shape or H-shape. The two noses project from the central section in a direction opposite to each other and transversely with respect to the plate portion subtended by the legs. When a plurality of such known cover elements is put in place on a slanting slope, these protrusions ensure a mutual interconnecting of the cover elements so that a stable construction is achieved. Moreover, the protrusions ensure that the necessary free spaces remain between adjoining cover elements between which the wave action working on the cover elements can be broken. Furthermore, these protrusions provided all around have the purpose of ensuring that the cover elements also anchor themselves in the ground because there is always one protrusion which has its end boring into the ground. For the proper functioning of these known cover elements in a breakwater or jetty construction, the six protrusions provided all around by the four legs of the X/H-form and the noses are of great importance.

BRIEF SUMMARY OF THE INVENTION

The purpose of the invention is to create an alternative concrete cover element for a breakwater/jetty construction.

A further purpose of the invention is on the one hand to create a durable, dependable, and well-functioning breakwater/jetty construction having a regularly arranged pattern and on the other hand to create one or more cover elements which make this possible or facilitate this.

Yet another purpose of the invention is to create on the one hand a durable, dependable, and well-functioning breakwater/jetty construction with which the consumption of material—especially concrete—required for that construction can be reduced, and on the other hand to create one or more cover elements which make this possible.

The applicant has come to the realization that, starting from a cover element of the type with X/H-shaped plate portion and two noses, if one or two diagonally opposite legs of the X/H-shaped plate portion are removed, the resulting cover element can form the base of a breakwater/jetty construction which is also very stable and possesses outstanding breakwater/jetty properties. This realization has resulted in a cover element according to a first aspect of the invention and a construction of a plurality of such cover elements according to a second aspect of the invention. In addition, this realization has led to further developments resulting in a cover element and a breakwater/jetty construction with a reduced consumption of material and/or improved breakwater/jetty action and/or easier placement and/or better remaining in place. This has resulted in cover elements according to a third, fourth, fifth, sixth and seventh aspect of the invention as well as the breakwater/jetty constructions achieved with them.

The third, fourth, fifth, sixth and seventh aspect of the invention are applicable—according to the invention—not only in combination with the first and/or second aspect of the invention, but also are applicable apart from the first and/or second aspect of the invention. Moreover, according to the invention, the third, fourth, fifth, sixth and seventh aspect of the invention are applicable in any desired combination with each other, as well as apart from each other. Without claiming to be exhaustive, this means for example for the third aspect of the invention that:

the third aspect can be applied in combination with the first and/or second aspect without the fourth aspect, the fifth aspect, the sixth aspect and the seventh aspect;

the third aspect can be applied in combination with the first and/or second aspect together with the fourth aspect, but without the fifth aspect, the sixth aspect and the seventh aspect;

the third aspect can be applied in combination with the first and/or second aspect together with the fourth aspect and the fifth aspect, but without the sixth aspect and the seventh aspect;

the third aspect can be applied in combination with the first and/or second aspect together with the fourth aspect, the fifth aspect, and the sixth aspect, but without the seventh aspect;

the third aspect can be applied in combination with the first and/or second aspect together with the fourth aspect, the fifth aspect, the sixth aspect, and the seventh aspect;

the third aspect can be applied without the first aspect, the second aspect, the fourth aspect, the fifth aspect, the sixth aspect and the seventh aspect;

the third aspect can be applied together with the fourth aspect, but without the first aspect, the second aspect, the fifth aspect, the sixth aspect and the seventh aspect;

the third aspect can be applied together with the fourth aspect and the fifth aspect, but without the first aspect, the second aspect, the sixth aspect and the seventh aspect;

the third aspect can be applied together with the fourth aspect, the fifth aspect, and the sixth aspect, but without the first aspect, the second aspect, and the seventh aspect;

the third aspect can be applied together with the fourth aspect, the fifth aspect, the sixth aspect and the seventh aspect, but without the first aspect and the second aspect;

the third aspect can be applied in combination with the first and/or second aspect together the fifth aspect, but without the fourth aspect, the sixth aspect and the seventh aspect;

the third aspect can be applied in combination with the first and/or second aspect together with the fifth aspect and the sixth aspect, but without the fourth aspect and the seventh aspect;

the third aspect can be applied in combination with the first and/or second aspect together with the fourth aspect, the fifth aspect and the sixth aspect, but without the fourth aspect;

the third aspect can be applied together with the fifth aspect, but without the first aspect, the second aspect, the fourth aspect, the sixth aspect and the seventh aspect;

the third aspect can be applied together with the fifth aspect and the sixth aspect, but without the first aspect, the second aspect, and the seventh aspect;

the third aspect can be applied together with the fifth aspect, the sixth aspect and the seventh aspect, but without the first aspect, the second aspect, the sixth aspect and the fourth aspect;

the third aspect can be applied in combination with the first and/or second aspect together the sixth aspect, but without the fourth aspect, the fifth aspect and the seventh aspect;

the third aspect can be applied in combination with the first and/or second aspect together the sixth aspect and the seventh aspect, but without the fourth aspect and the fifth aspect;

the third aspect can be applied together the sixth aspect, but without the first aspect, the second aspect, the fourth aspect, the fifth aspect and the seventh aspect;

the third aspect can be applied together the sixth aspect and the seventh aspect, but without the first aspect, the second aspect, the fourth aspect, and the fifth aspect;

the third aspect can be applied in combination with the first aspect and/or the second aspect, together the seventh aspect, but without the fourth aspect, the fifth aspect and the sixth aspect;

the third aspect can be applied together the seventh aspect, but without the first aspect, the second aspect, the fourth aspect, the fifth aspect and the sixth aspect;

the third aspect can be applied in combination with the first aspect and/or the second aspect, together the fourth and sixth aspect, but without the fifth aspect and the seventh aspect;

the third aspect can be applied in combination with the first aspect and/or the second aspect, together the fourth, sixth aspect, and seventh aspect, but without the fifth aspect;

the third aspect can be applied together the fourth aspect and the sixth aspect, but without the first aspect, the second aspect, the fifth aspect and the seventh aspect;

the third aspect can be applied together the fourth aspect, the sixth aspect, and the seventh aspect, but without the first aspect, the second aspect, and the fifth aspect;

the third aspect can be applied in combination with the first and/or the second aspect, together the fourth aspect and the seventh aspect, but without the fifth aspect and the sixth aspect the third aspect can be applied together the fourth aspect and the seventh aspect, but without the first aspect, the second aspect, the fifth aspect and the sixth aspect;

the third aspect can be applied in combination with the first and/or the second aspect, together the fourth aspect, the fifth aspect and the seventh aspect, but without the sixth aspect;

the third aspect can be applied together the fourth aspect, the fifth aspect and the seventh aspect, but without the first aspect, the second aspect, and the sixth aspect;

Without repeating this example for the fourth aspect, the fifth aspect, the sixth aspect and seventh aspect, it will be evident that this also holds accordingly for the fourth, fifth, sixth and seventh aspect, respectively.

First Aspect

In another and more detailed manner—than has been sketched out for the realization of the applicant—the cover element according to the first aspect may be described as:

Cover element of concrete for a breakwater or jetty construction, such as a slope, wherein an x-axis, a y-axis and a z-axis define an imaginary system of axes, such as a system of orthogonal axes, and wherein the x-axis and y-axis define an xy-plane and the z-axis is at right angles to the xy-plane;

wherein the cover element comprises a plate portion and two noses, wherein the plate portion extends in the direction of the xy-plane and has a thickness which extends in the direction of the z-axis, and wherein the two noses project in the direction of the z-axis from the plate portion, in a direction opposite each other, and are formed as a single part with the plate portion;

wherein the plate portion should be imagined as being:
  formed from an imaginary quadrangular plate—such as a trapezium or a parallelogram, such as a rectangle, square, or rhombus with a first plate diagonal which extends parallel to the y-axis and a second plate diagonal which extends parallel to the x-axis, wherein the quadrangular plate is bounded in the xy-plane by four imaginary plate corners and four imaginary plate edges;
  of which imaginary plate two opposite imaginary plate edges are each incised in an imaginary manner at the middle of the respective plate edge to form a plate recess; and
  of which imaginary plate at least one of the two imaginary corners situated on the first plate diagonal is cut off in an imaginary manner along a first secant which cuts both imaginary plate edges bounding the respective corner;

wherein the plate portion has a first dimension measured along the first plate diagonal and a second dimension measured along the second plate diagonal; and wherein the first dimension is smaller than the second dimension.

If the quadrangular plate of which the plate portion can be imagined to be formed is square, the imaginary system of xyz-axes will be a system of orthogonal axes in the first aspect of the invention.

According to the second aspect of the invention, the cover element according to the first aspect of the invention can be placed very efficiently in rows, wherein the cover elements in one row each lie with their noses on the same line, so that the noses hold the plate portions at a mutual spacing and free spaces remain between the plate portions in which the wave action of the water working on them can be broken or arrested. According to the second aspect of the invention, several of such rows running in the horizontal direction can be placed slanting one on top of the other along the inclination of a slope. When the cover elements are placed in such rows on a slope, the plate portions extend in a vertical plane, with the first plate diagonals running substantially vertically with the cut ends of those first plate diagonals pointing downward and the second plate diagonals running substantially horizontally so that they are supported by one end of the second plate diagonal against the inclination of the slope and so to speak hang between the ends of the second plate diagonal. Due to the pressure of cover elements situated above them, the ends of the second plate diagonal of lower-lying cover elements which are resting against the inclination are—according to the second aspect of the invention—pressed firmly into the inclination and thus offer a resistance to sliding downward along the inclination. Successive rows placed one on top of the other can also—according to the second aspect of the invention—be offset with respect to each other. A plate portion from an upper row is then braced against one or more noses of plate sections of a lower row. This improves the interconnection of the plurality of cover elements according to the invention, so that the stability of the construction increases. However, the rows need not be offset with respect to each other. The plate sections of upper rows may also be supported in each case against plate sections of lower rows. In this way, a construction with very good breakwater and jetty properties is achieved. Obviously, the consumption of material—that is, the quantity of concrete required—from cover element according to the invention is significantly less than for a comparable known cover element of the type with X/H-shaped plate portion and two noses. They are therefore not only cheaper, but also easier to manipulate and transport. However, the cover element according to the first aspect of the invention can also be placed on an incline in a well-spaced relationship that results in a stable construction with excellent breakwater and jetty properties due to the interstices between adjoining plate sections. Due to the well-spaced relationship, the consumption of material—that is, the quantity of concrete required—for the resultant breakwater/jetty construction is significantly less then that for constructions made from comparable known cover elements of the type with X/H-shaped plate portion and two noses.

In yet another embodiment of the cover element according to the first aspect of the invention, both corners of the plate situated on the first plate diagonal are cut along a said first secant. The resulting plate sections thus have an essentially elongated shape, which elongated shape extends in the direction of the second plate diagonal. When the cover elements in the aforementioned rows are placed one on top of the other on a slope, the elongated plate sections will extend in the horizontal direction with the one end of the elongated plate portion resting against the slope and the other end of the elongated plate portion resting against the lower row of cover elements.

The cover element according to another embodiment of the first aspect of the invention is further characterized in that the first dimension amounts 35% to 65% of the length of the first plate diagonal. According to yet another embodiment of the first aspect of the invention, the cover element is characterized in that the first dimension amounts 40% to 50% of the length of the first plate diagonal. The length of the first plate diagonal here is the distance between the imaginary plate corners, situated on this first plate diagonal, of the imaginary initial plate from which the plate portion can be imagined to be formed.

According to another embodiment of the cover element according to the first aspect of the invention, the first secant is a straight line and it runs at an angle of 70° to 90°—more particularly at an angle of 80° to 90°, such as 90°—with respect to the first plate diagonal.

In yet another embodiment of the cover element according to the first aspect of the invention, the plate portion is moreover to be imagined as that all four of the imaginary plate edges are each incised at the middle of the respective plate edge to form said plate recess. Thus, a cover element is obtained with a plate portion which is formed in imaginary manner from a quadrangular initial plate which is incised in the middle along each of the four plate edges in order to obtain four plate recesses, which would produce an X-shaped plate portion if the corners situated on the first plate diagonal are not cut off.

According to another embodiment of the cover element with four of those imaginary plate recesses, the plate portion according to the first aspect of the invention is furthermore to be imagined as that one of the corners situated on the second plate diagonal is cut along a second secant, which second secant on the one hand intersects one of the first secants and on the other hand intersects one of the plate edges which borders on the corner cut along the second secant. This realizes a further savings of material—that is, especially concrete—while the breakwater or jetty action of a construction made with such cover elements is still excellent.

According to another embodiment of the cover element according to the first aspect of the invention with second (imaginary) secant, the second secant extends in parallel with one of the imaginary plate edges which borders on the corner which is cut along the second secant. In particular, the second secant will in this case touch the deepest point of the plate recess incised in one of the imaginary plate edges that borders on the corner cut along the second secant. This forms a "slanting" side surface on the plate portion, which can, when the cover element is placed on an incline, extend in parallel with that incline.

According to another embodiment of the cover element according to the first aspect of the invention, each plate recess, viewed in the direction of the xy-plane, has xy-dimensions which, viewed in the direction of the z-axis, are substantially constant. That is, each plate recess is open, viewed in the direction of the z-axis, on both sides of the plate portion 16, and has unchanging xy-dimensions, viewed in the direction of the z-axis.

According to a further embodiment of the cover element according to the first aspect of the invention, at least two of the plate recesses, such as all four of the plate recesses, have a depth which, measured from a line perpendicular to the corresponding plate edge, is at least 20% of a thickness of the nose measured in the same direction, wherein the thickness of the nose is measured at a distance from the end of the nose which is around 20% of the thickness of the plate. According to another embodiment, that depth of the plate recess is at least 25%, such as at least 30% of the thickness of the nose measured in the same direction.

Where this application speaks of a "corresponding plate edge" in relation to a plate recess, this means the plate edge in which this plate recess is cut out.

According to a further embodiment of the cover element according to the first aspect of the invention, the width of a plate recess can be characterized in that this width, measured on and along the corresponding plate edge, is at least 80% of a width of the nose measured in the same direction, wherein the width of the nose is measured here at a distance from the end of the nose which is around 20% of the thickness of the plate. According to yet another embodiment, this width of the plate recess at the location of the plate edge is at least 95%, such as at least 100%, of the width of a nose measured in the same direction.

According to a further embodiment of the cover element according to the first aspect of the invention, the plate recesses, viewed in the xy-plane, are trapezoidal, with the longest side being situated at the corresponding plate edge.

According to a further embodiment of the cover element according to the first aspect of the invention, the noses, viewed in the direction of the z-axis, have a height which is at least 80%, such as 100% or more, of the thickness of the plate portion. The height of each nose may thus be equal to the thickness of the plate portion.

According to a further embodiment of the cover element according to the first aspect of the invention, the noses are centred on the middle of the imaginary quadrangular plate.

According to a further embodiment of the cover element according to the first aspect of the invention, the noses, viewed in the direction of the xy-plane, have a quadrangular, especially a square cross-sectional shape. Each corner of the quadrangular cross-sectional shape of said nose, viewed in a perpendicular projection of the respective nose on the imaginary plate, may lie approximately on an imaginary line which connects the centre point of the imaginary plate edge to the centre point of the nose. Thus, a nose is provided which has a flat top side whenever the second plate diagonal runs substantially horizontally. This is advantageous in connection with another corresponding cover element being supported on it.

According to another further embodiment of the cover element according to the first aspect of the invention, in the case of a cover element with quadrangular nose, each corner of the quadrangular cross-sectional shape of a nose, viewed in a perpendicular projection of the respective nose on the imaginary plate, lies approximately on the first or second plate diagonal.

According to a further embodiment of the cover element according to the first aspect of the invention, the thickness of the plate portion is approximately 25% to 42%, such as approximately ⅓, of the length of the imaginary plate edges.

According to a further embodiment of the cover element according to the first aspect of the invention, the thickness of the plate portion is approximately 20% to 30% of the second dimension measured along the second plate diagonal.

According to further embodiment of the cover element according to the first aspect of the invention, the thickness of the plate portion lies in the range of 30 cm to 150 cm.

According to further embodiment of the cover element according to the first aspect of the invention, one of the imaginary plate edges has a length in the range of 90 cm to 450 cm. In particular, all the imaginary plate edges will have a length in this range.

According to further embodiment of the cover element according to the first aspect of the invention, the imaginary plate edges have approximately the same lengths among each other.

Second Aspect

According to the second aspect, the invention relates to a breakwater or jetty construction comprising a plurality of cover elements of the type formed from an X-shaped or H-shaped plate portion with:
  four legs determined by the X-shape or H-shape, two of which lie on a first diagonal of the plate portion and two on a second diagonal of the plate portion; and
  with two noses being at right angles to the plate portion, projecting in opposite direction from the plate portion; wherein at least one of the two legs situated on a first diagonal is removed from the plate portion;
wherein the plurality of cover elements is arranged in horizontal rows, lying one above another against a slope, with the noses of the adjoining cover elements of each row lying on a line and with the second diagonal of each cover element being horizontally oriented;
wherein a first of the legs of the covers elements of each row that are situated on the second diagonal is in each case supported on two adjacent noses of adjacent cover elements from a lower row, while the other of the legs of the cover elements of that row which are situated on the second diagonal is supported against the slope.

Thus, a placement of cover elements on the slope is achieved which resembles that of roofing tiles with alternately staggered (horizontal) rows of tiles. This results in a firm interconnection.

In other words, the invention according to the second aspect relates to a breakwater or jetty construction, such as a slope or jetty, comprising a plurality of cover elements according to the first aspect of the invention and/or according to the yet to be discussed third aspect of the invention and/or according to the yet to be discussed fourth aspect of the invention and/or according to the yet to be discussed fifth aspect of the invention and/or according to the yet to be discussed sixth aspect of the invention and/or according to the yet to be discussed seventh aspect of the invention.

According to a further embodiment of the construction according to the second aspect of the invention, the cover elements are placed in horizontal rows lying one on top of another against the slope with the first plate diagonal substantially vertical; the noses of adjacent cover elements of each row lie on the same line; a first corner portion of a cover element from an upper row is supported in each case on two adjacent noses of adjacent cover elements from a lower row, the first corner portion being situated on the second plate diagonal; and a second corner portion of the upper row is supported in each case on the slope, the second corner portion being situated on the second diagonal. The noses of a cover element of an upper row are in each case supported on a second corner portion of a cover element of a lower row, the second corner portion being situated on the second plate diagonal.

According to a further embodiment of the construction according to the second aspect of the invention, the cut corner portion on the second plate diagonal faces away from the slope with the second secant facing upwards.

Third Aspect

Worded independently of the first, second, fourth, fifth, sixth and seventh aspect of the invention, the third aspect of the invention provides a cover element which can be described as:

A cover element of concrete for a breakwater or jetty construction, such as a slope,
  wherein an x-axis, a y-axis and a z-axis define an imaginary system of orthogonal axes and wherein the z-axis and the x-axis define a zx-plane;
  wherein the cover element comprises a central section, two noses, a first leg and a second leg, wherein the central section, the two noses and the first and second leg are formed as a single part;
  wherein the noses extend from the central section in the direction of the z-axis in opposite directions with respect to each other, and the first and the second leg extend from the central section in the direction of the x-axis;
  wherein the bottom side of the first leg has a first width parallel to the z-axis, and the top side of the second leg has a second width parallel to the z-axis;
  wherein the noses have a top and/or bottom support surface, which support surface borders on the free end of the respective nose and which may optionally extend substantially parallel to the zx-plane; and wherein, in a direction parallel to the z-axis, the support surface has a length which is less than 50% of the width of the first leg and the width of the second leg, respectively.

The cover element according to the third aspect of the invention can be placed very efficiently in regular rows, according to a so-called roofing tile construction. In this roofing tile construction, the noses of the cover elements of each row always lie on the same line with a mutual distance between the legs of the cover elements. Successive rows placed one on top of the other are staggered with respect to each other. A cover element from the upper row is then supported against the noses of the cover elements from a lower row. Because each cover element is provided with a top and/or bottom support surface at the free end of the nose, the stability of the breakwater construction is increased. Because the length of the support surfaces is shorter than 50% of the width of the second supporting leg, it is ensured that a free gap is present between two facing noses of cover elements from the same row. Water acting on the slope can pass through these gaps. Thus, the wave action of water acting on the slope is broken or restrained. This free gap furthermore has the consequence that the quantity of material (i.e. the quantity of concrete) that is needed from unit of surface for such a roofing tile construction is reduced.

The upper and/or lower support surface ensures that the cover elements are, as it were, recessed with respect to one another. If an upper support surface is present, a portion of the leg of the upper cover element will come to lie beneath the top of the attachment of the nose to the central section of the cover element situated underneath. In this way, the leg is as it were anchored to the support surfaces of the cover elements situated underneath the cover element, which goes benefits the stability of the construction. If a lower support surface is present, the bottom of the attachment of the nose of the cover element situated above will come to lie against the central section of that cover element beneath the top of the leg of a cover element situated underneath. This again increases the stability of the slope.

Just as with the second aspect of the invention, the cover elements according to the third aspect of the invention in the so-called roofing tile construction can be supported with at least one leg against the incline, so that the weight and the pressure of cover elements lying above firmly press the legs of lower cover elements supported against the incline into the incline and thus present a resistance to sliding down the incline.

According to a further embodiment of the third aspect of the invention, the lengths of the upper and/or lower support surface, measured in the direction of the z-axis, are at most 40%, more particularly at most 35% of the width of the first leg, or the width of the second leg, respectively. In order to ensure that the legs are adequately supported by being supported against the respective support surfaces, the lower and/or upper support surface have a minimum length of 15%, more particularly a minimum length of 25%, of the width of the first leg or the width of the second leg, respectively.

Where this application speaks of a length "in the direction of the z-axis", or in the direction of another axis, this means the length as measured along a line which is parallel to the respective axis, in this example, the z-axis.

According to a further embodiment of the third aspect of the invention, the noses have an upper and/or lower guide surface which is slanted with respect to the zx-plane, wherein the upper and/or lower support surface, viewed from the free end of the respective nose and in the direction of the central section, borders on the upper or lower guide surface, respectively. In other words, the noses, viewed in the direction of the z-axis, and measured from the central section to the free end of the respective nose, have a nose length which is greater than the length of the support surface of that respective nose. The guide surfaces in this embodiment are positioned between the support surface and the central section and are slanted with respect to the zx-plane. The guide surface and support surface may be a single slanted surface, wherein the slanted guide surface and the support surface merge into one another. They may merge into one another with an offset (difference in slant) or without an offset (each the same slant). It is also possible for the guide surface to be slanted with respect to the zx-plane, while the support surface runs parallel to the zx-plane. The guide surfaces ensure that the cover elements can be placed more easily in a staggered roofing tile construction because, during the placement of the construction, they guide the leg of one cover element with respect to the support surfaces of two other cover elements into the correct position. Moreover, the guide surfaces increase the stability of the resulting construction because—when the construction is in place—they prevent sideways sliding of cover elements with respect to each other. By producing the guide surface and support surface as a single slanted surface and having them pass into one another, it is easy to correct for unevenness in the terrain whenever several of such cover elements are placed on an inclination, such as a slope, as a single construction according to the second aspect of the invention. Namely, the slanting guide/support surface allow the legs of a cover element from an upper row to come to rest at a higher or lower point on the support surface of a nose of a cover element from the lower row as the position of the support element of the lower row deviates from the intended mutual position with respect to the support element of the upper row as a result of the unevenness of the terrain—or inaccuracies during the laying.

According to yet a further embodiment of the cover element according to the third aspect of the invention, the noses have an upper and/or lower spacer which extends in the direction of the zx-plane, wherein the upper and/or lower guide surface, viewed from the free end of the nose and in the direction of the central section, borders on the upper or lower spacer, respectively. In other words, the noses, viewed in the direction of the y-axis, have a nose height which is smaller in the section of the nose at the support surface than in the section of the nose which is located, viewed in the z-direction, between the support surface of the nose and the central section. The guide surface, the spacer and the central section are a connected whole. The spacer extends mostly parallel to the zx-plane. The spacer ensures that the legs of two cover elements situated horizontally next to each other are further separated from each other, which results in a savings in material (i.e. concrete). The spacer, measured in the direction of the z-axis, may have a minimum length of 20%, such as at least 30%, of the width of the legs. The guide surface and adjoining support surface may once again be a single slanted surface, wherein the slanting guide surface and the support surface merge into each other. Again, they may merge into each other with an offset or without an offset. It is also possible for the guide surface to be slanting with respect to the zx-plane, while the support surface runs parallel to the zx-plane.

According to a further embodiment of the cover element according to the third aspect of the invention, each nose has an aforementioned upper support surface which is designed as a guide surface—in other words, the support surface and guide surface form a whole—which, viewed from the central section and with respect to the zx-plane, has a downward slant, and wherein the bottom side of the first leg is provided on both sides with an upward slant, viewed from the middle of the first leg and with respect to the zx-plane. By on the one hand designing the support surface as a guide surface with a downward slant and on the other hand providing the bottom side of the legs with an upward slant, the legs of a higher cover element can slide by their upward slant relatively easily along the downward slant of a nose of a lower cover element during the placement of such cover elements on an inclination, such as a slope. According to another embodiment of the third aspect of the invention, the angle of inclination of the downward slant and the angle of inclination of the upward slant may be approximately the same.

According to a further embodiment of the cover element according to the third aspect of the invention, the noses of the cover element each have two support surfaces: both a support surface at the top of each nose and a support surface at the bottom of each nose.

According to a further embodiment of the cover element according to the invention, the first leg and the second leg are the same width.

Fourth Aspect

Worded independently of the first, second, third, fifth, sixth and seventh aspect of the invention, the fourth aspect of the invention provides a cover element which can be described as:

A cover element of concrete for a breakwater or jetty construction, such as a slope,
wherein an x-axis, a y-axis and a z-axis define an imaginary system of orthogonal axes and wherein the z-axis and the x-axis define a zx-plane;
wherein the cover element comprises a central section, two noses, a first leg and a second leg, wherein the central section, the two noses and the first and second leg are formed as a single part;
wherein the noses extend from the central section in the direction of the z-axis in opposite directions with respect to each other, and the first and the second leg extend from the central section in the direction of the x-axis; and
wherein at least one of the noses has a nose recess which extends from a first longitudinal side of the nose to a second longitudinal side of the nose, situated opposite the first longitudinal side.

The nose recess thus extends from a first longitudinal side of the nose to a second longitudinal side of the nose, situated opposite the first longitudinal side. Water can thus flow via the nose recess from the one longitudinal side to the other opposite longitudinal side of the nose. Thus, the nose recess as it were increases the porosity of a slope consisting of several cover elements according to the fourth aspect of the invention. The nose recess according to the fourth aspect of the invention can be applied without the first, second, third, sixth and seventh aspect of the invention, as well as in combination with one or more of the first, second, third, sixth and seventh aspect.

Just as with the second aspect of the invention, the cover elements according to the fourth aspect of the invention in the so-called roofing tile construction can be supported with at least one leg against the incline, so that the weight and the pressure of cover elements lying above firmly press the legs of cover elements lying below and supported against the incline into the incline and thus present a resistance to sliding down the incline.

According to a further embodiment of the fourth aspect of the invention, the nose recess is situated in the surface at the free end of the nose and there forms a depression in the free end of the nose.

According to yet a further embodiment of the fourth aspect of the invention, the nose recess is as it were a passageway through the nose. This embodiment may also be in combination with the nose recess formed as a depression in the free end of the nose. Each nose may also have several nose recesses, one or more of said passageways, and/or one or more of said depressions.

According to a further embodiment of the cover element according to the fourth aspect of the invention, an imaginary connecting line can be drawn between the first longitudinal side and the second longitudinal side, through the nose recess, which connecting line is at an angle with respect to the zx-plane. This angle may lie in the range of 30° to 60° and may be, for example, 45°. This slanting of the nose recess makes it hard for the water to pass through and thus promotes the breakwater/jetty action of the slope. Water flowing through the passageway will dissipate more energy.

According to a further embodiment of the cover element according to the fourth aspect of the invention, both noses have an aforementioned nose recess.

In order to maintain adequate stiffness in the nose, the nose recess should not be too deep according to the fourth aspect of the invention. As the maximum limit, a depth of 60% of the length of the nose can be mentioned, but preferably the nose recess is not deeper than 40% of the length of the nose. The length of the nose is measured here from the free end of the nose, in the direction of the z-axis, to the central section. The depth of the nose recess is defined here in the direction of the z-axis. In order for the nose recess to be effective, the nose recess should also have a minimum depth of 5%, such as for example 10% of the length of the nose.

Fifth Aspect

Worded independently of the first, second, third, fourth, sixth and seventh aspect of the invention, the fifth aspect of the invention provides a cover element which can be described as:

A cover element of concrete for a breakwater or jetty construction, such as a slope,
wherein an x-axis, a y-axis and a z-axis define an imaginary system of orthogonal axes and wherein the z-axis and the x-axis define a zx-plane;
wherein the cover element comprises a central section, two noses, a first leg and a second leg, wherein the central section, the two noses and the first and second leg are formed as a single part;
wherein the noses extend from the central section in the direction of the z-axis in opposite directions with respect to each other, and the first and the second leg extend from the central section in the direction of the x-axis;
wherein the noses have an upper and a lower support surface, which support surfaces extend parallel to the zx-plane;
wherein the lower support surface is displaced in the direction of the x-axis with respect to the upper support surface; and
wherein the upper and lower support surface overlap each other at most partly in the direction of the y-axis.

According to the fifth aspect of the invention, the upper and lower support surface of a nose are displaced with respect to each other, viewed in the direction of the x-axis. This mutual displacement in this application is designated in short by the term "mutual displacement of the support surfaces". As a result of this "mutual displacement of the support surfaces", the support surfaces will not entirely overlap each other, viewed in the direction of the y-axis. In particular, one of the support surfaces or both support surfaces will have a section which is not overlapped by the other support surface, viewed in the direction of the y-axis.

Just as with the second aspect of the invention, the cover elements according to the fifth aspect of the invention in the so-called roofing tile construction can be supported with at least one leg against the incline, so that the weight and the pressure of cover elements lying above firmly press the legs of cover elements lying below and supported against the incline into the incline and thus present a resistance to sliding down the incline.

As a result of the "mutual displacement of the support surfaces", in the case of rows of cover elements situated one above the other on an inclination such as a slope, the mutual distance between the rows situated one on top of the other, viewed in the direction of the mutual displacement (i.e., in the direction of the x-axis) can be increased. On the one hand, this means that when laying cover elements on an incline or slope, the cover elements are able to compensate for variations in the angle of inclination of the incline or slope. In other words, the dimensional accuracy of the angle of inclination of the incline or slope is less critical This greatly facilitates the laying of the cover elements. On the other hand, this means that, viewed in a direction upward along the incline or slope, there is a savings in the quantity of material used, i.e. concrete, because the number of rows of cover elements needed to cover an incline or slope can be reduced in this way.

According to a further embodiment of the cover element according to the fifth aspect of the invention, the upper and lower support surface can be displaced with respect to each other in the direction of the x-axis so that the lower and upper support surface, viewed in the direction of the y-axis, do not overlap each other.

According to further embodiments of the cover element according to the fifth aspect of the invention, the support surfaces can border on the free end of the nose on which they are provided.

According to further embodiments of the cover element according to the fifth aspect of the invention, the cover element can moreover comprise a third and/or fourth leg, which third or fourth leg is formed as a single part with the central section and which extends from the central section in the direction of the z-axis, while in the case of both a third and a fourth leg, the legs extend in opposite directions with respect to each other from the central section.

Sixth Aspect

Worded independently of the first, second, third, fourth, fifth, and seventh aspect of the invention, the sixth aspect of the invention provides a cover element which can be described as:

A cover element of concrete for a breakwater or jetty construction, such as a slope,
wherein an x-axis, a y-axis and a z-axis define an imaginary system of orthogonal axes;
wherein the cover element comprises a central section, two noses, a first leg and a second leg, wherein the central section, the two noses and the first and second leg are formed as a single part;
wherein the noses extend from the central section in the direction of the z-axis in opposite directions with respect to each other, and the first and the second leg extend from the central section in the direction of the x-axis in opposite directions with respect to each other;
wherein the central section is provided with a passageway extending in the direction of the y-axis from the bottom side of the cover element to the top side of the cover element, which passageway is designed such that water which is located beneath the cover element and which exerts an upward pressure on the cover element can escape via this passageway so as to relieve the cover element of upward pressure.

Water pushed upward with great force against a slope has a tendency to want to lift the cover elements, as it were, which decreases the downward pressure of the cover element on the ground. As a consequence of this, the cover elements may be shifted by the forces exerted by the water. This is effectively prevented by providing the cover elements with a passageway through the central section of the cover element. This passageway connects the bottom side of the cover element to the top side of the cover element, so that water which pushes on the cover element from below can escape through this passageway in the upward direction. Thus, the cover element will lie much better. Said passageway will generally extend vertically, but it may also run at a slant with respect to the vertical.

Just as with the second aspect of the invention, the cover elements according to the sixth aspect of the invention in the so-called roofing tile construction can be supported with at least one leg against the incline, so that the weight and the pressure of cover elements lying above firmly press the legs of cover elements lying below and supported against the incline into the incline and thus present a resistance to sliding down the incline.

Seventh Aspect

Worded independently of the first, second, third, fourth, fifth, and sixth aspect of the invention, the seventh aspect of the invention provides a cover element which can be described as:

A cover element of concrete for a breakwater or jetty construction, such as a slope,
wherein an x-axis, a y-axis and a z-axis define an imaginary system of orthogonal axes and wherein the z-axis and the x-axis define a zx-plane and the z-axis and the y-axis define a zy-plane;
wherein the cover element comprises a central section, two noses, a first leg and a second leg, wherein the central section, the two noses and the first and second leg are formed as a single part;
wherein the noses extend from the central section in the direction of the z-axis in opposite directions with respect to each other, and the first and the second leg extend from the central section in the direction of the x-axis in opposite directions with respect to each other; and
wherein:
the top side of the second leg extends in the direction of the zx-plane and at the central section it adjoins a rear side surface portion of the central section that extends in the direction of the zy-plane,
and/or
the bottom side of the first leg extends in the direction of the zx-plane and at the central section it adjoins a front side surface portion of the central section that extends in the direction of the zy-plane.

By having a substantially horizontal top side of the second leg adjoin a substantially vertical rear side surface portion of the central section, an abutment surface is created for cover elements of a higher row that are resting against the second leg, which prevents these noses from sliding on or across the central section of the lower cover element. In a corresponding manner, an abutment surface is created on the bottom side of the first leg by having a substantially horizontal bottom side of the first leg adjoin a substantially vertical front side surface portion of the central section. This prevents a higher cover element from sliding on or across the noses of two lower cover elements. The stability of a construction according to the second aspect of the invention can thus be significantly improved.

Just as with the second aspect of the invention, the cover elements according to the seventh aspect of the invention in the so-called roofing tile construction can be supported with at least one leg against the incline, so that the weight and the pressure of cover elements lying above firmly press the legs of lower cover elements supported against the incline into the incline and thus present a resistance to sliding down the incline.

According to a further embodiment of the cover element according to the seventh aspect of the invention, said rear side surface portion are substantially at right angles to the top side of the second leg.

According to a further embodiment of the cover element according to the seventh aspect of the invention, said front side surface portion are substantially at right angles to the bottom side of the first leg.

BRIEF DESCRIPTION OF THE DRAWINGS

The present invention shall be explained more in more detail below by means of a few embodiments and with reference to the drawings, in which:

FIG. 1b shows a perspective view of the first cover element of FIG. 1a;

FIG. 2b shows a perspective view of the second cover element of FIG. 2a;

FIG. 3b shows a perspective view of the third cover element of FIG. 3a;

FIG. 4b shows a perspective view of the fourth cover element of FIG. 4a;

FIG. 5b shows a perspective view of the fifth cover element of FIG. 5a;

FIG. 6 shows a schematic perspective view of a slope according to the second aspect of the invention;

DETAILED DESCRIPTION OF EMBODIMENTS SHOWN IN THE DRAWINGS

Figure 1A:
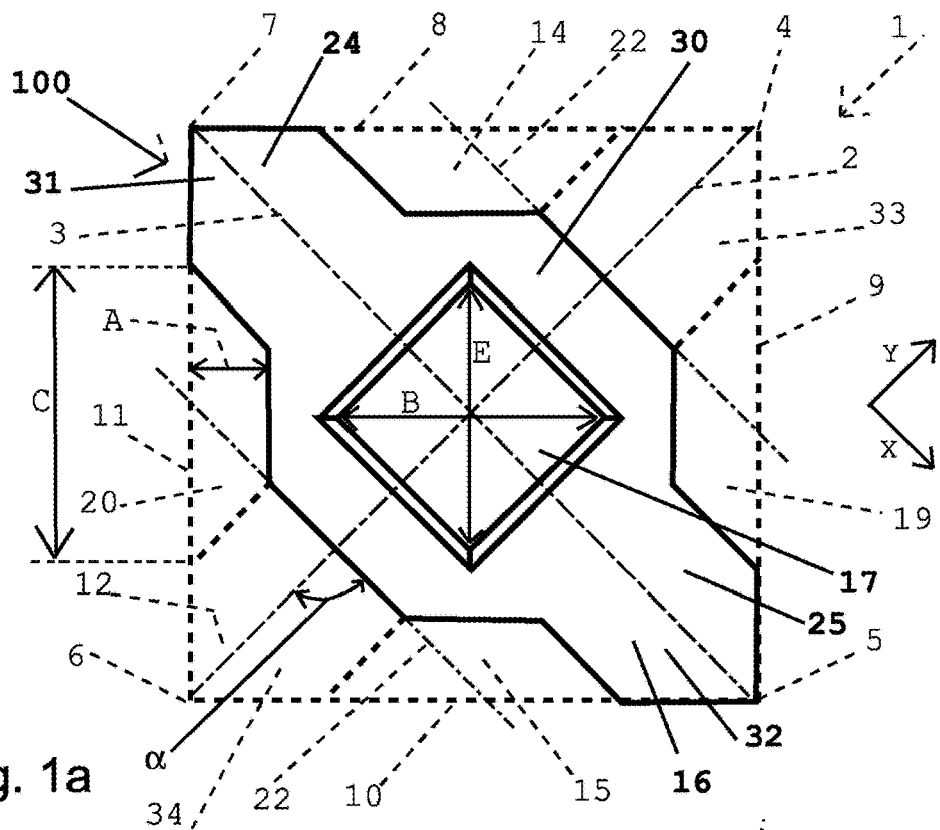
FIG. 1a shows a top view of a first cover element according to the first aspect of the invention.
Figure 1B:
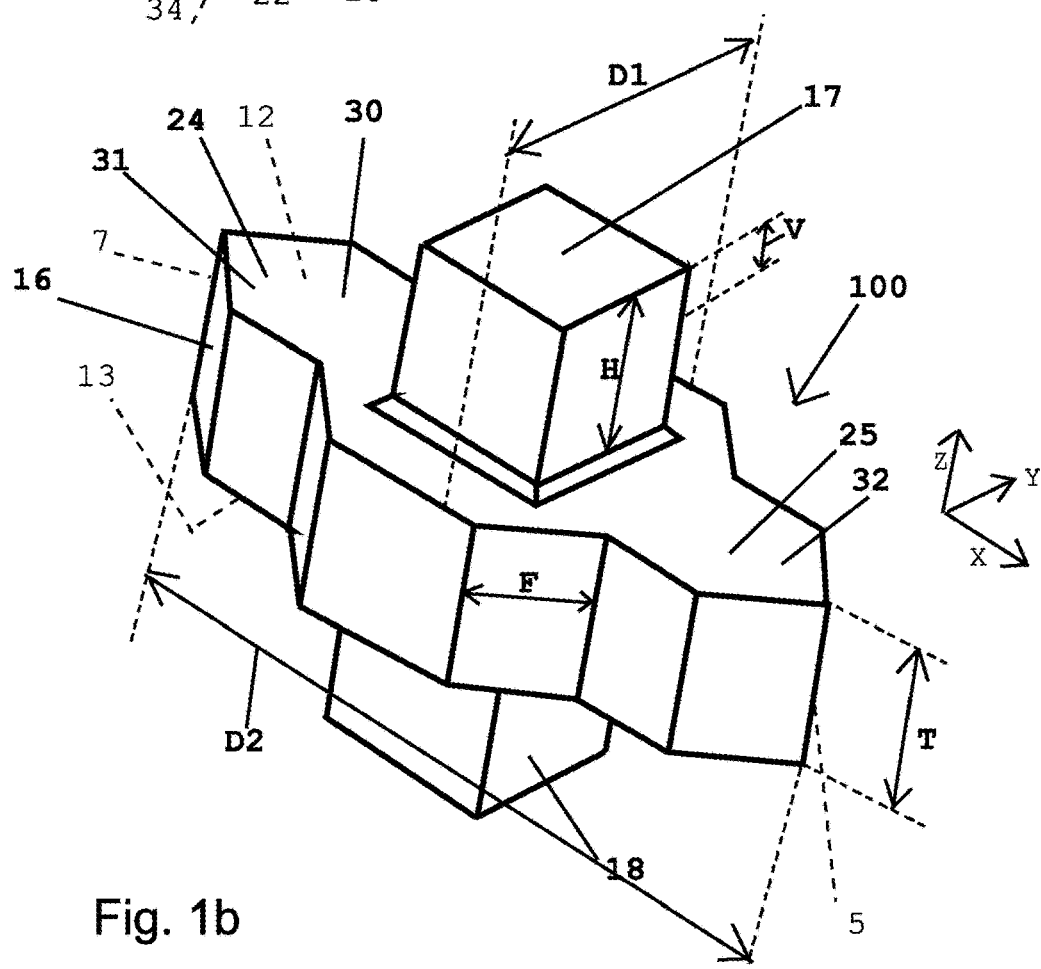
Figure 2A:
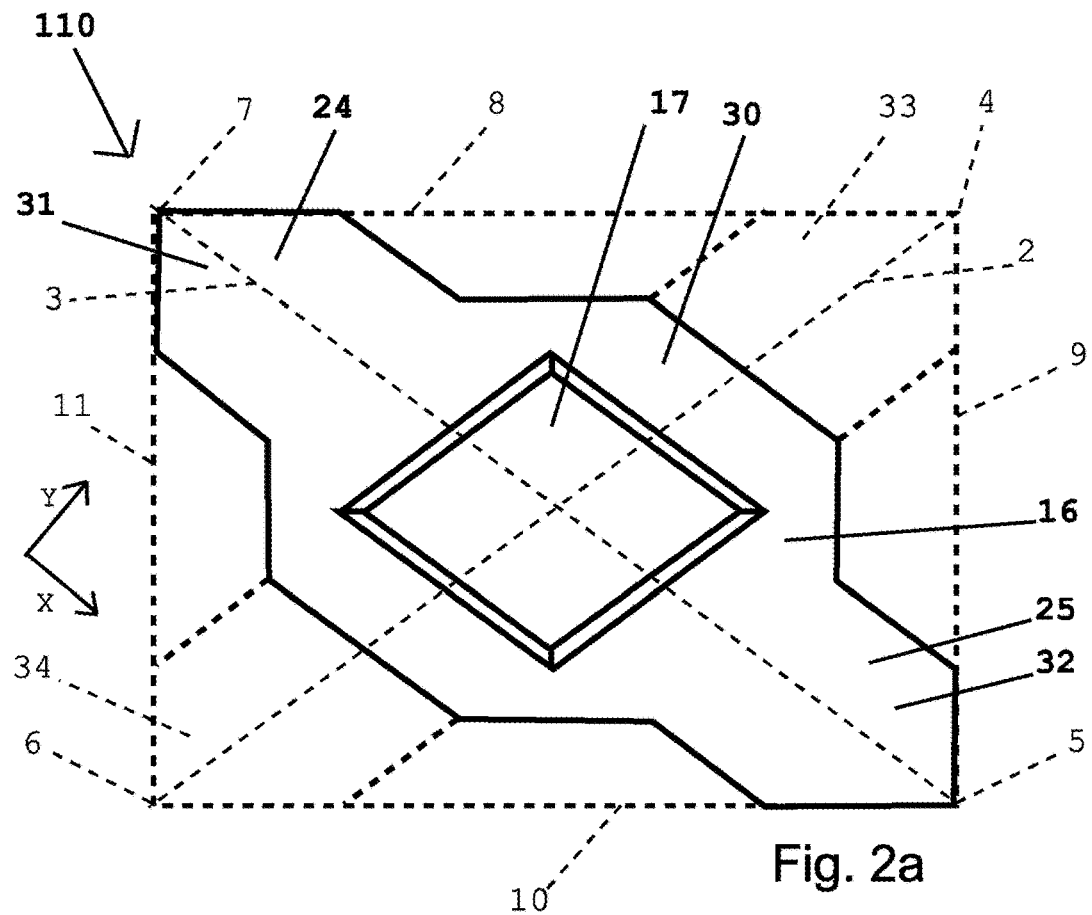
FIG. 2a shows a top view of a second cover element according to the first aspect of the invention.
Figure 2B:
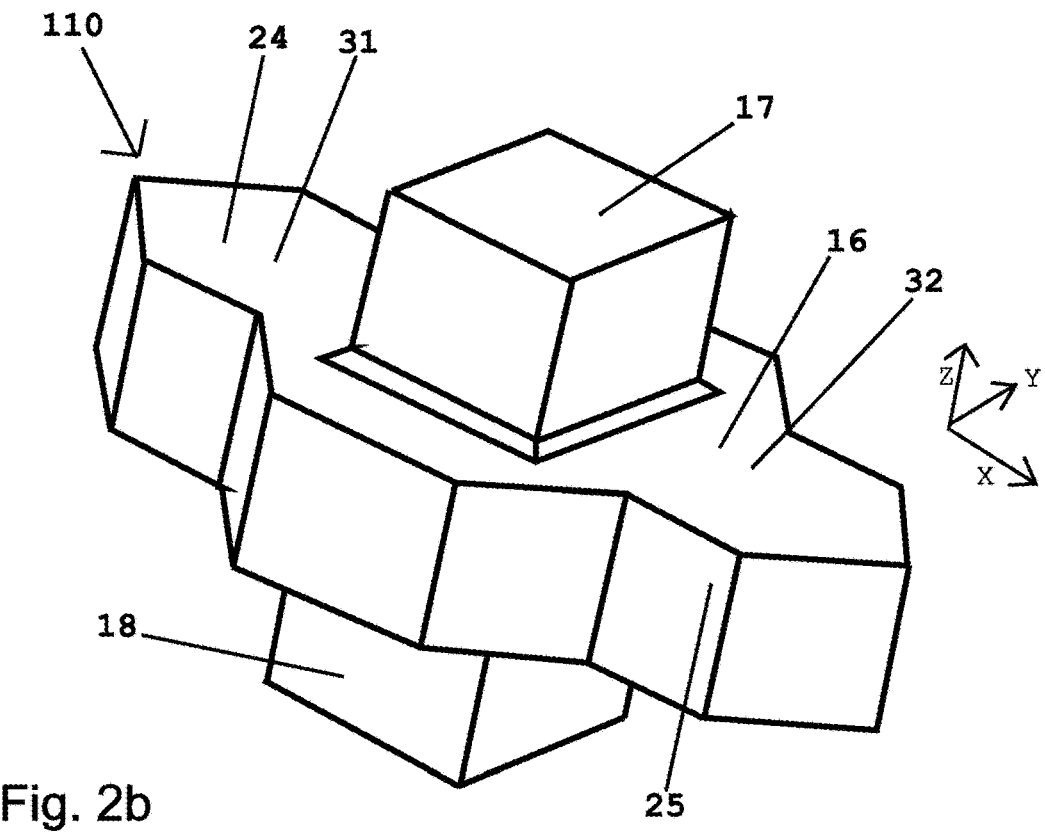
Figure 3A:
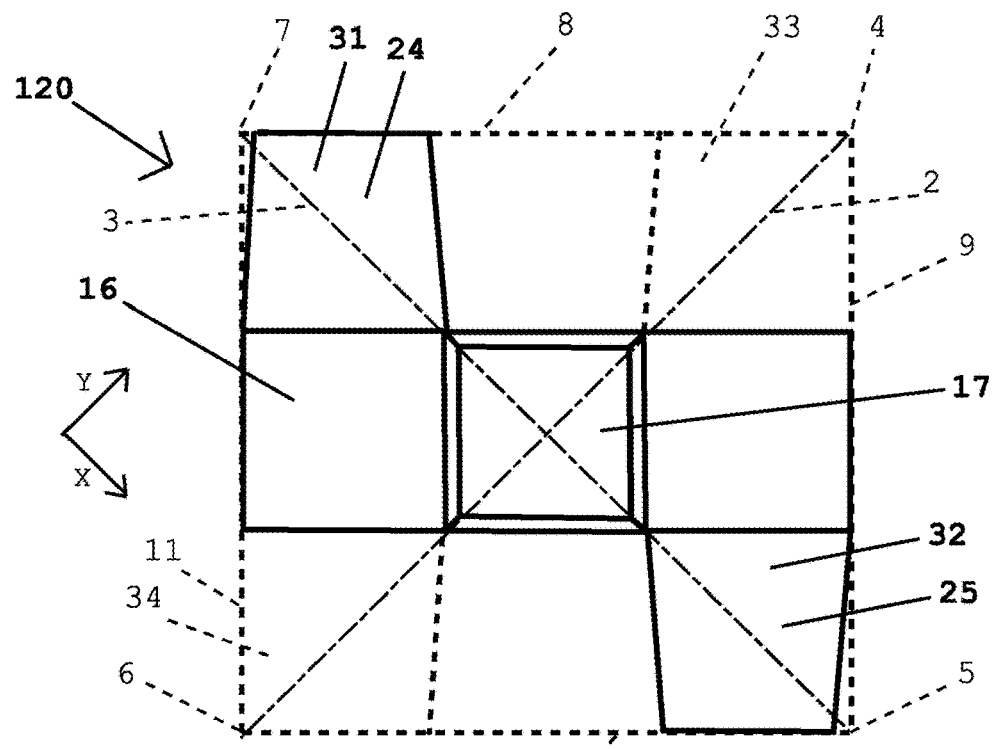
FIG. 3a shows a top view of a third cover element according to the first aspect of the invention.
Figure 3B:
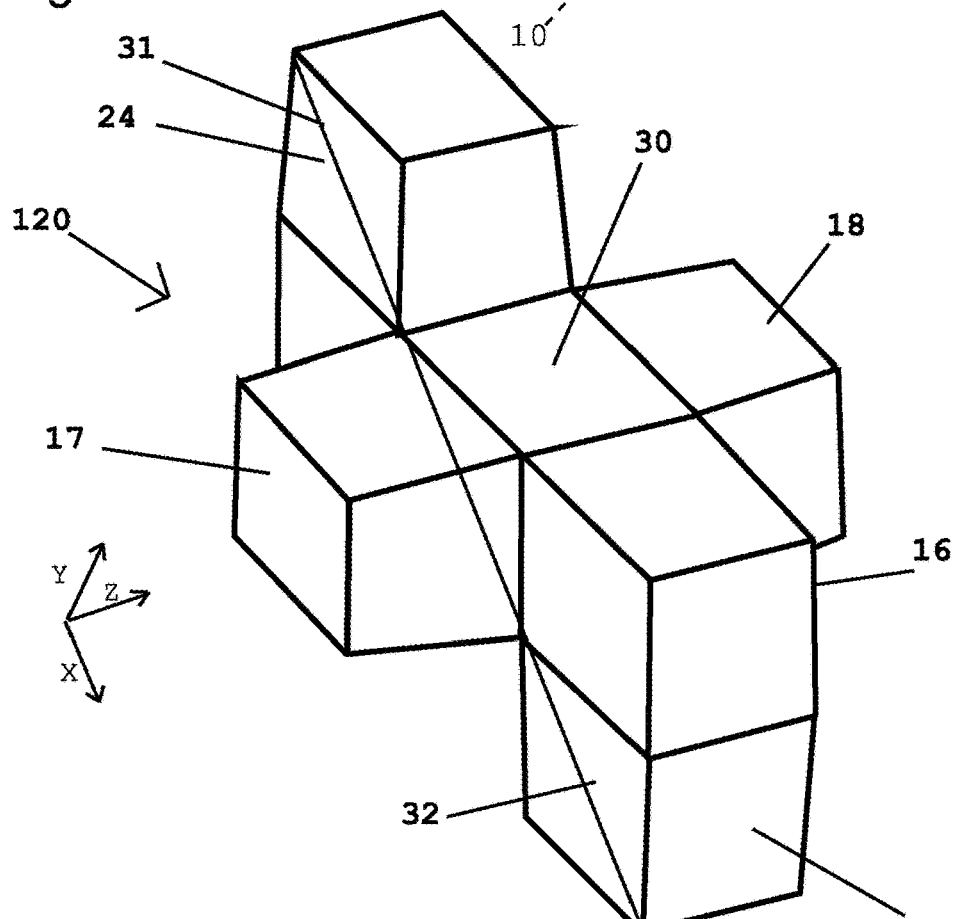
Figure 4A:
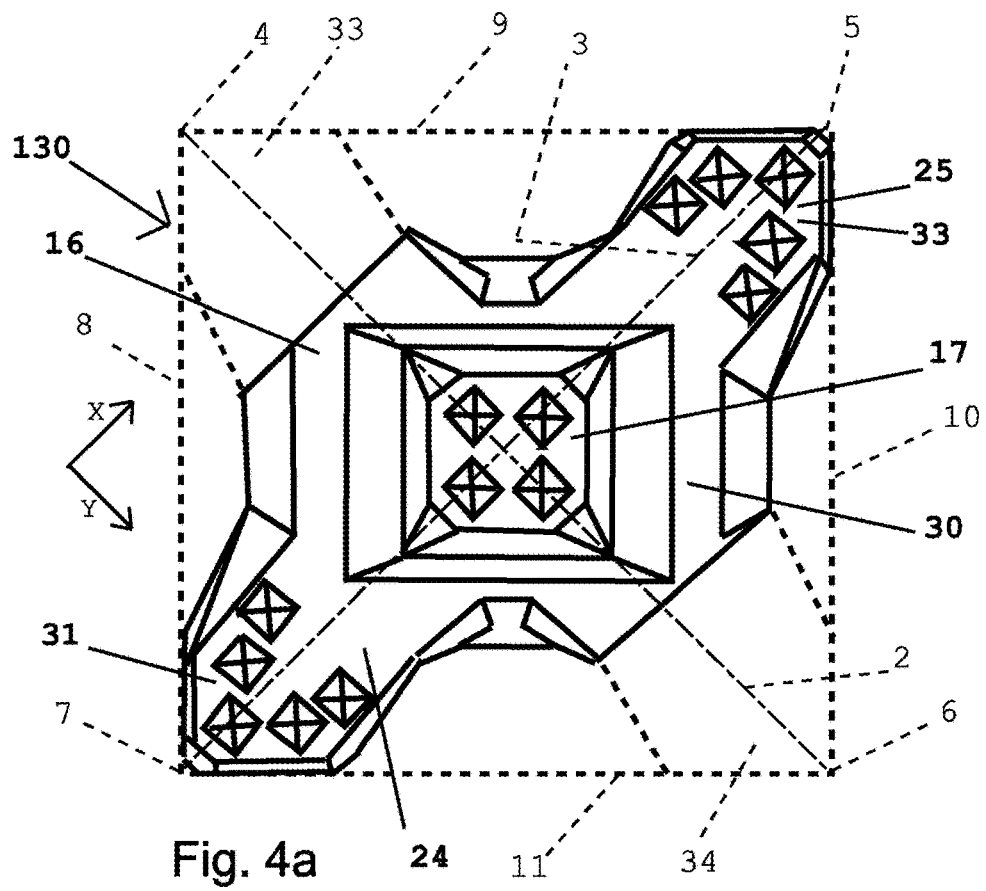
FIG. 4a shows a top view of a fourth cover element according to the first aspect of the invention.
Figure 4B:
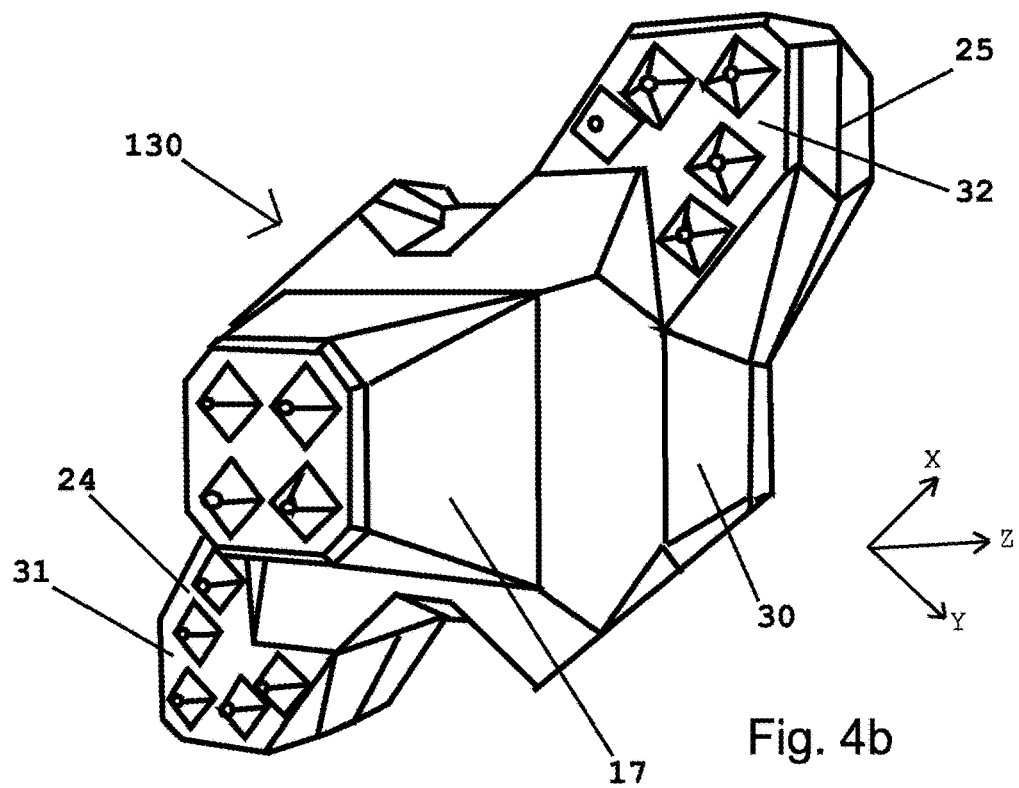
Figure 5A:
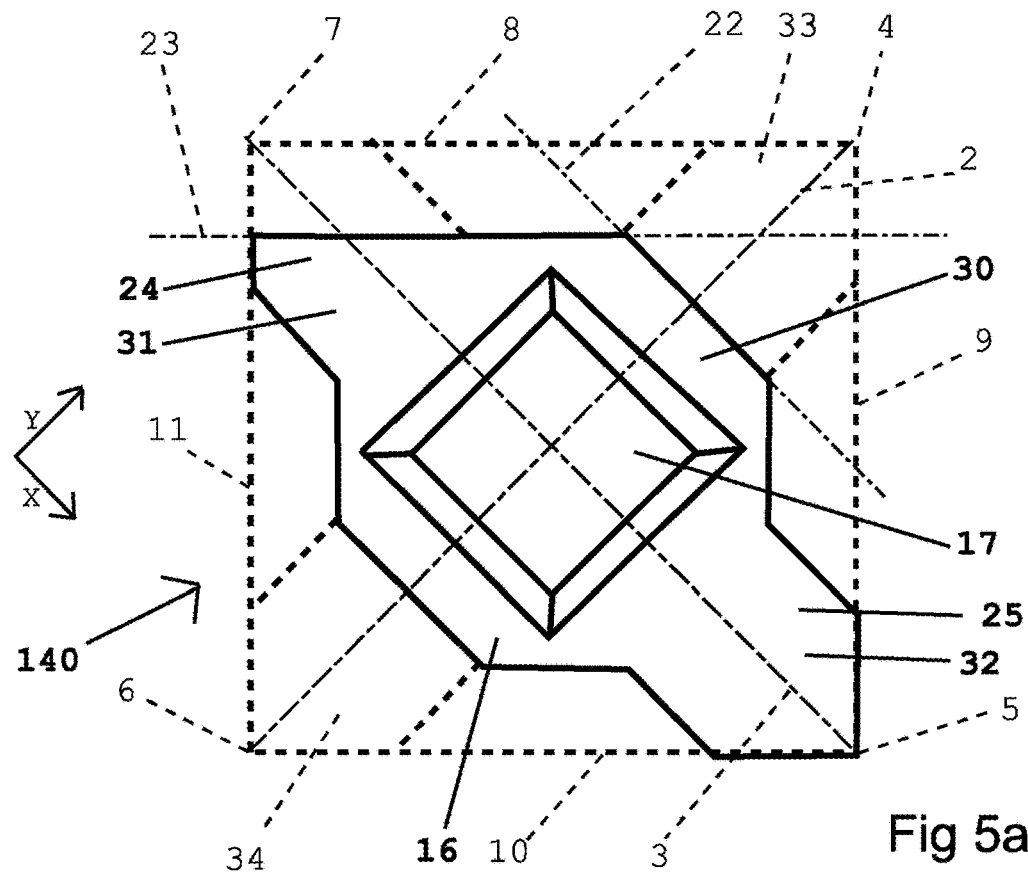
FIG. 5a shows a top view of a fifth cover element according to the first aspect of the invention.
Figure 5B:
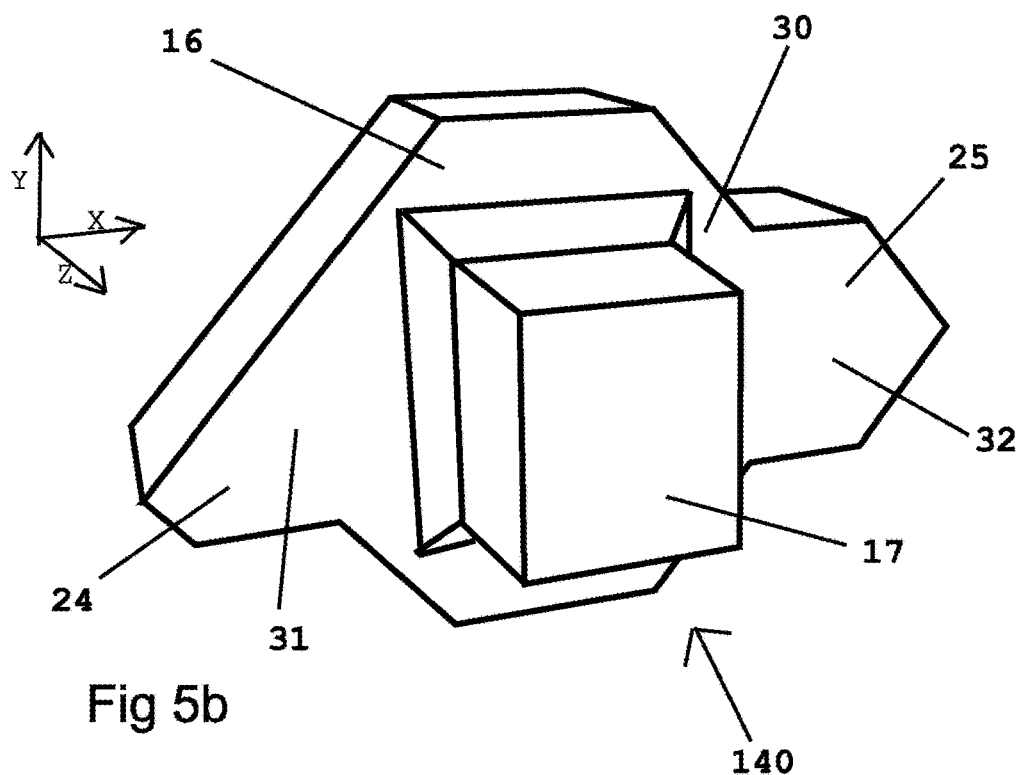
Figure 13:
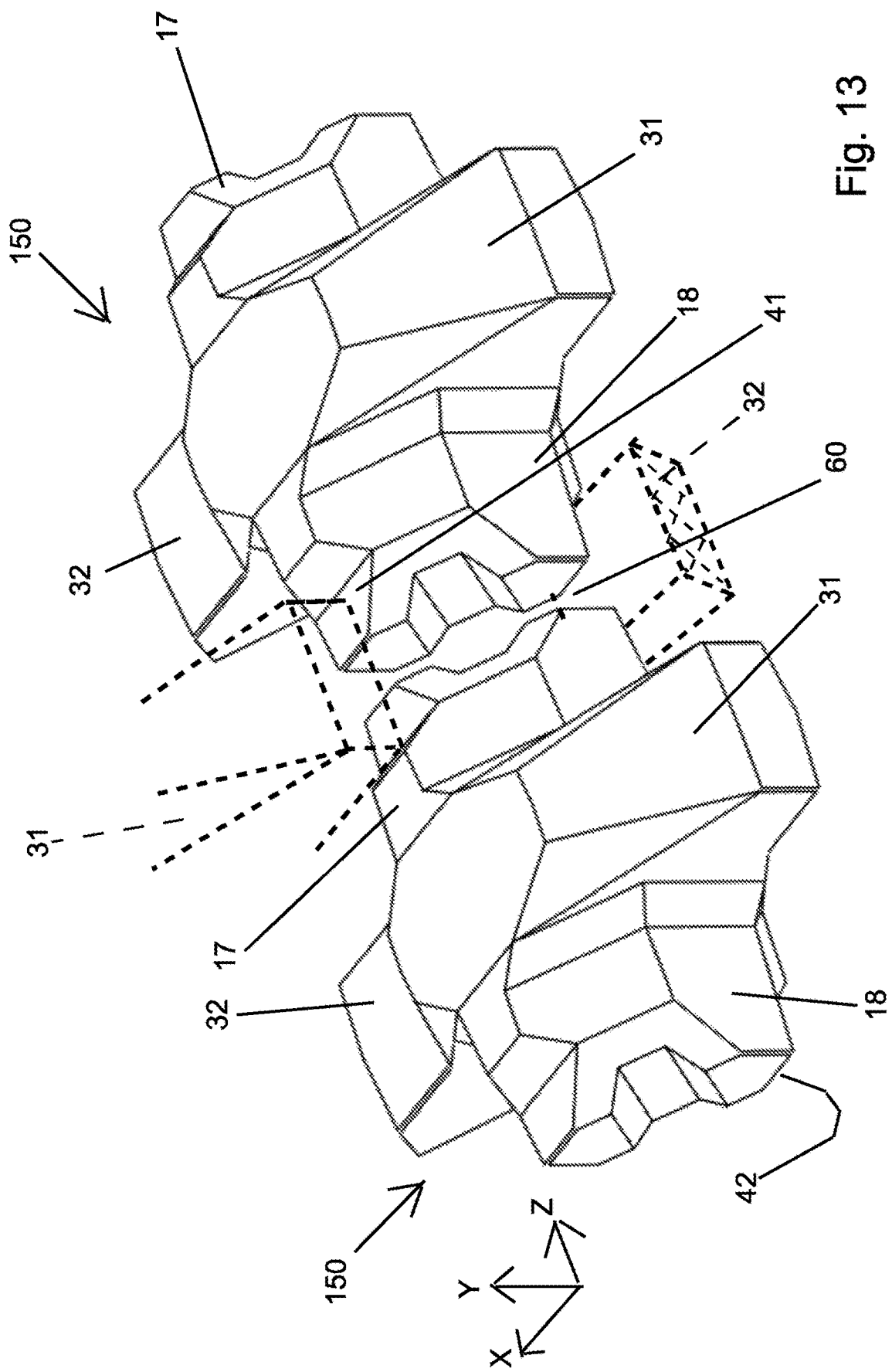
FIG. 13 shows a schematic perspective view of a pair of sixth cover elements, to illustrate the third, fourth and fifth aspect of the invention for a slope according to the second aspect of the invention.
Figure 14:
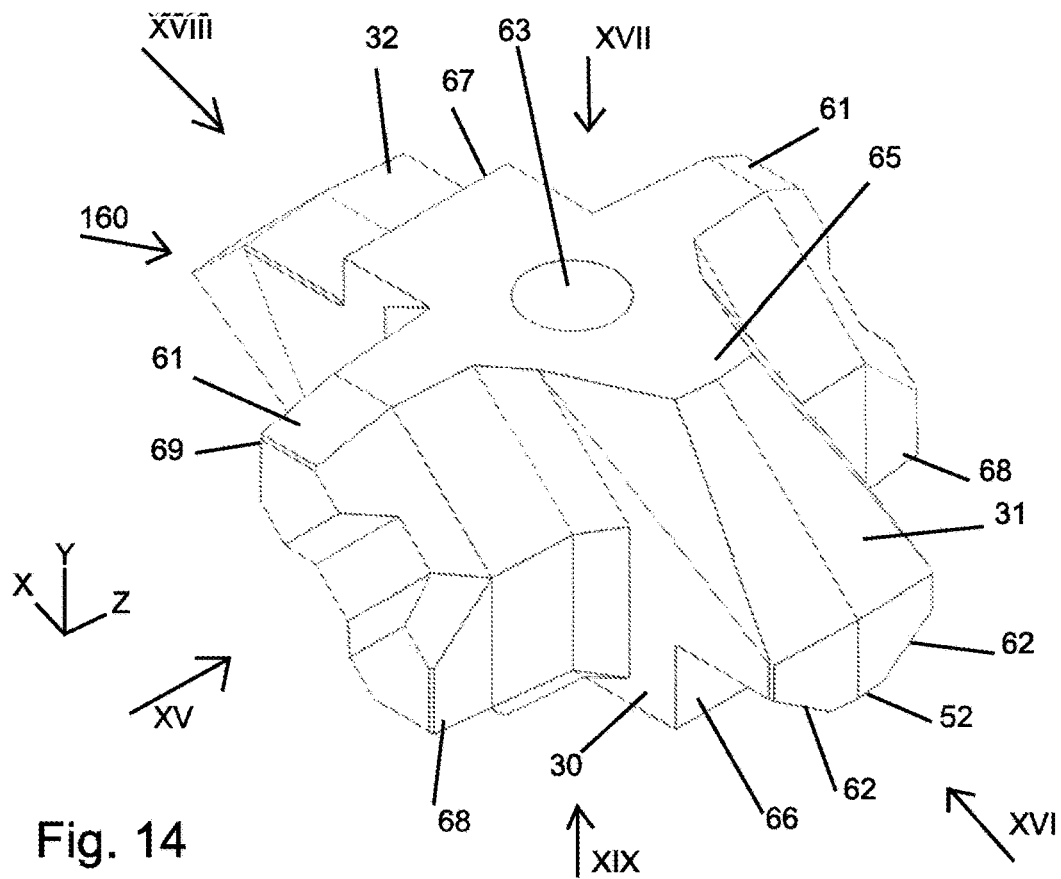
FIG. 14 shows a perspective view of a seventh cover element according to the first, third, fourth, fifth, sixth and seventh aspect of the invention.
Figure 15:
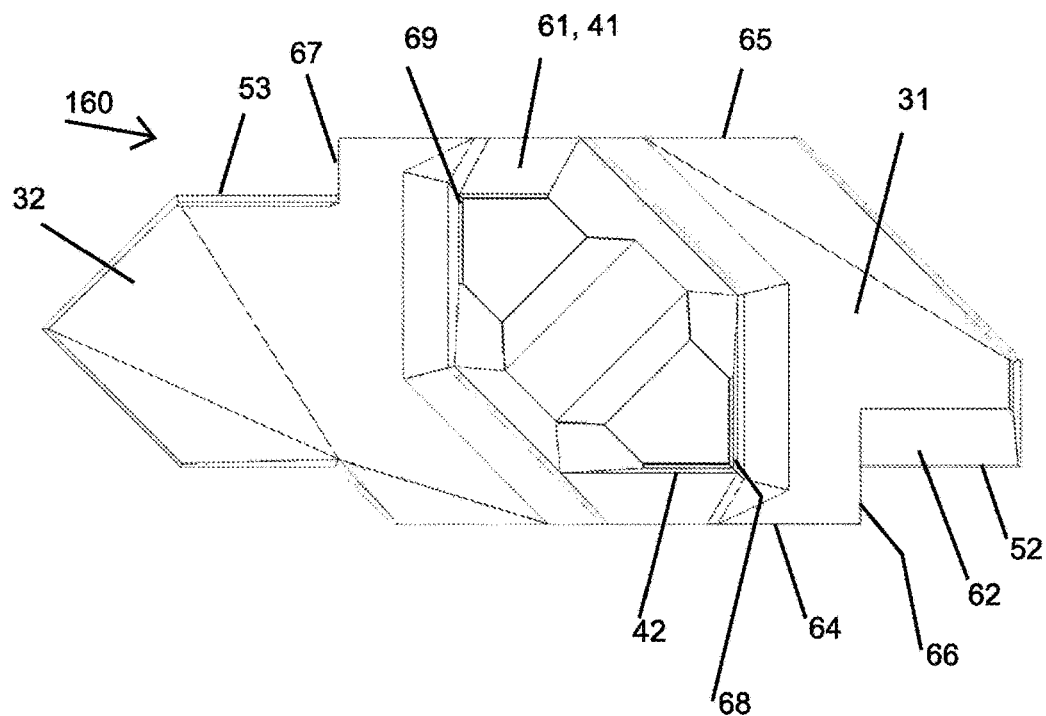
FIG. 15 shows a side view of the seventh cover element of FIG. 14, viewed along arrow XV in FIG. 14.
Figure 16:
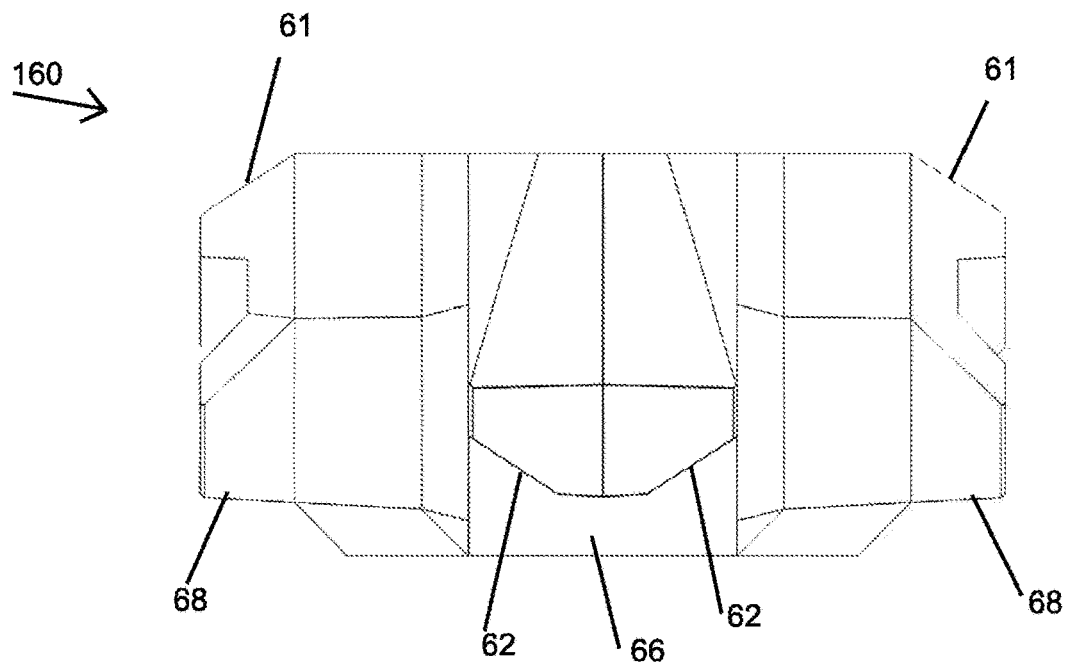
FIG. 16 shows a front view of the seventh cover element of FIG. 14, viewed along arrow XVI in FIG. 14.
Figure 17:
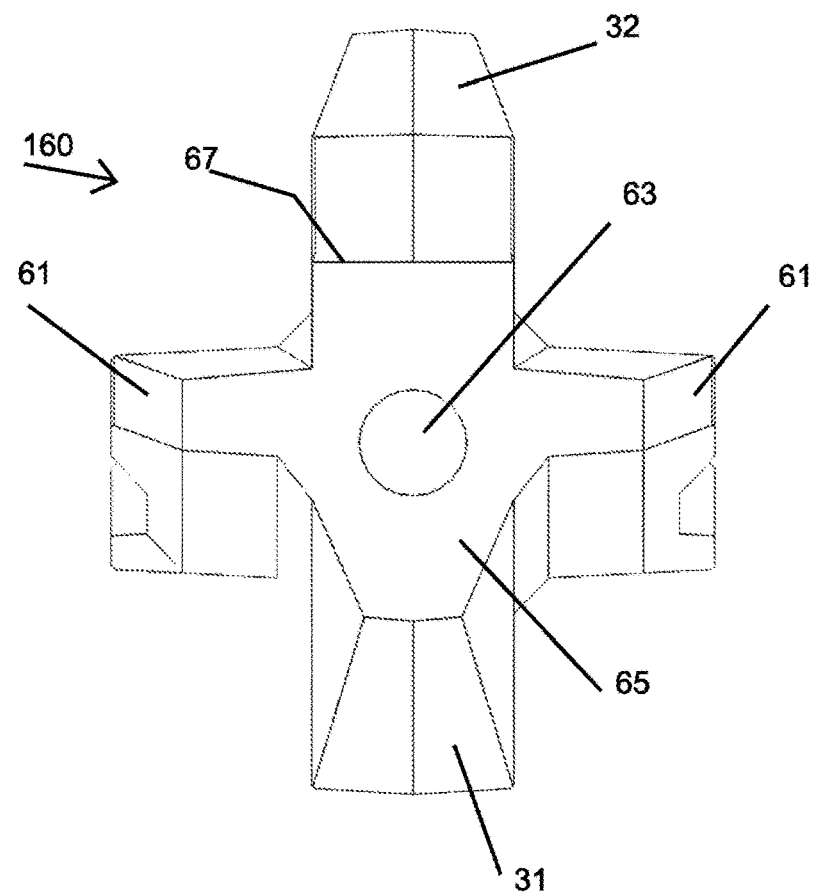
FIG. 17 shows a top view of the seventh cover element of FIG. 14, viewed along arrow XVII in FIG. 14.
Figure 18:
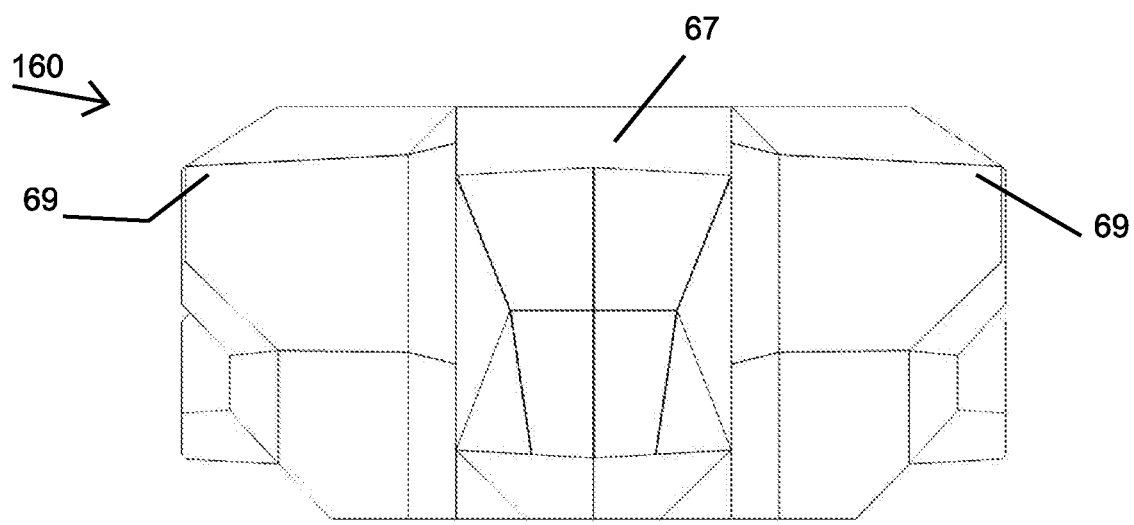
FIG. 18 shows a rear view of the seventh cover element of FIG. 14, viewed along arrow XVIII in FIG. 14.
Figure 19:
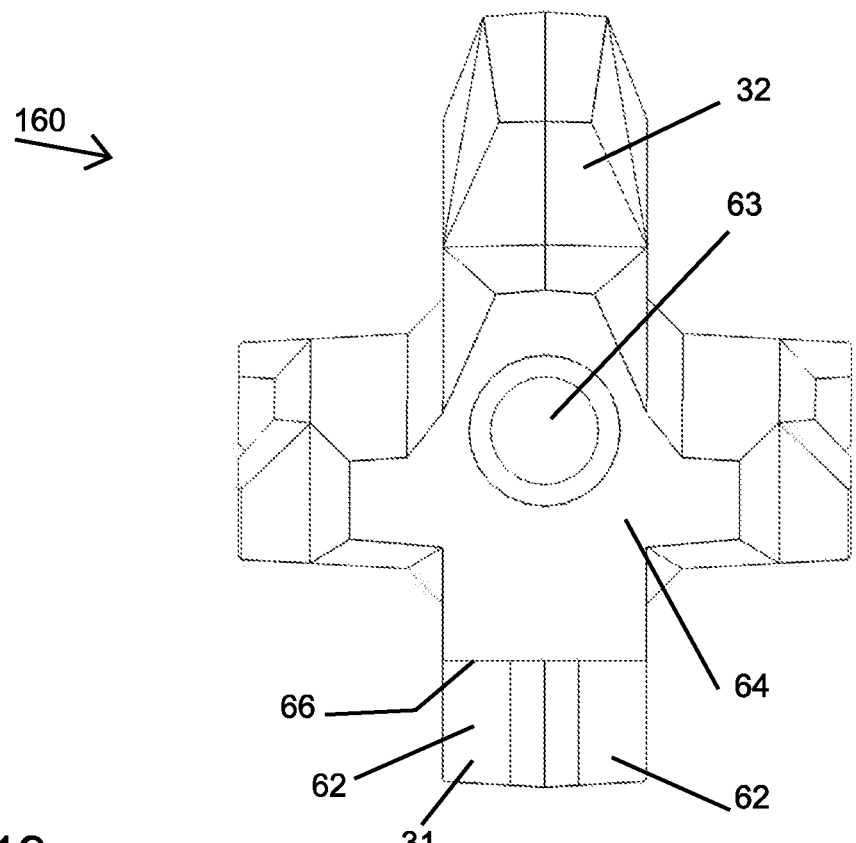
FIG. 19 shows a bottom view of the seventh cover element of FIG. 14, viewed along arrow XIX in FIG. 14.
Figure 20:
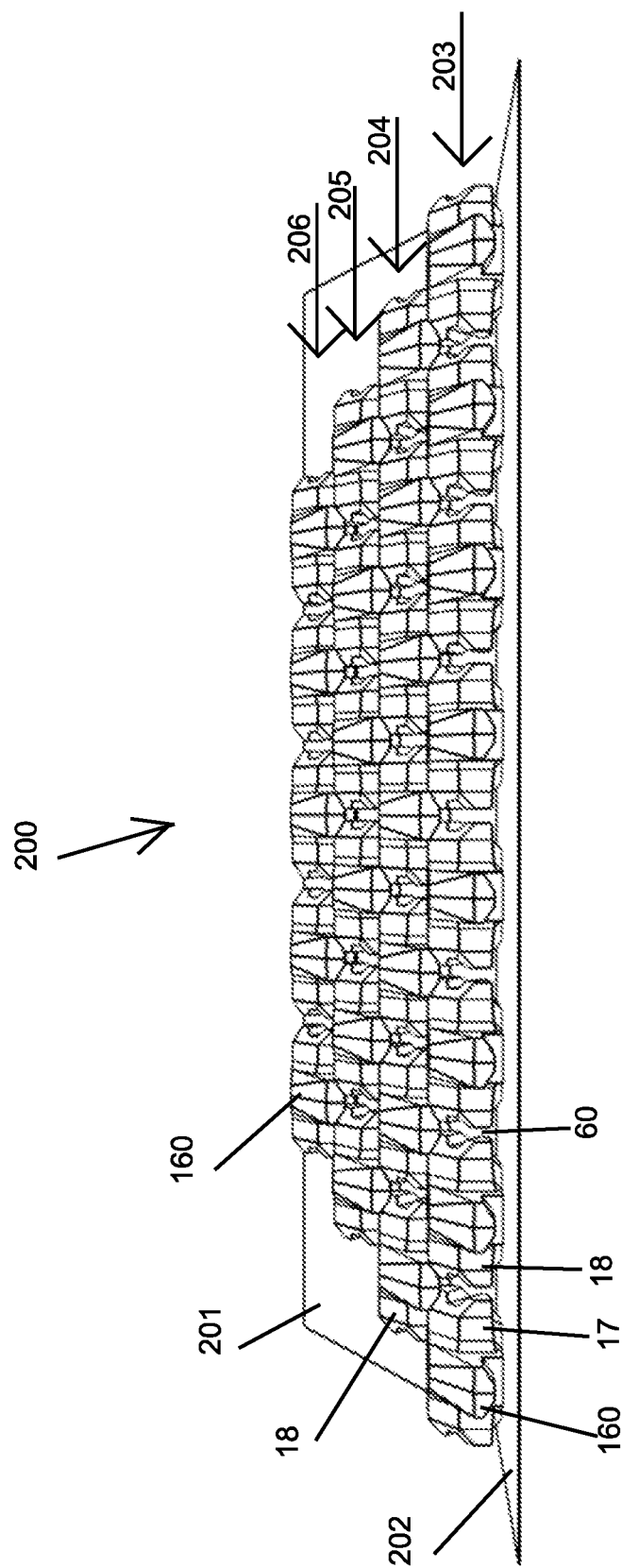
FIG. 20 shows a schematic front view of a slope with a breakwater and/or jetty construction according to the second aspect of the invention, wherein the construction is placed on a slope and is constructed with seventh cover elements as shown in FIGS. 14-19.
Figure 21:
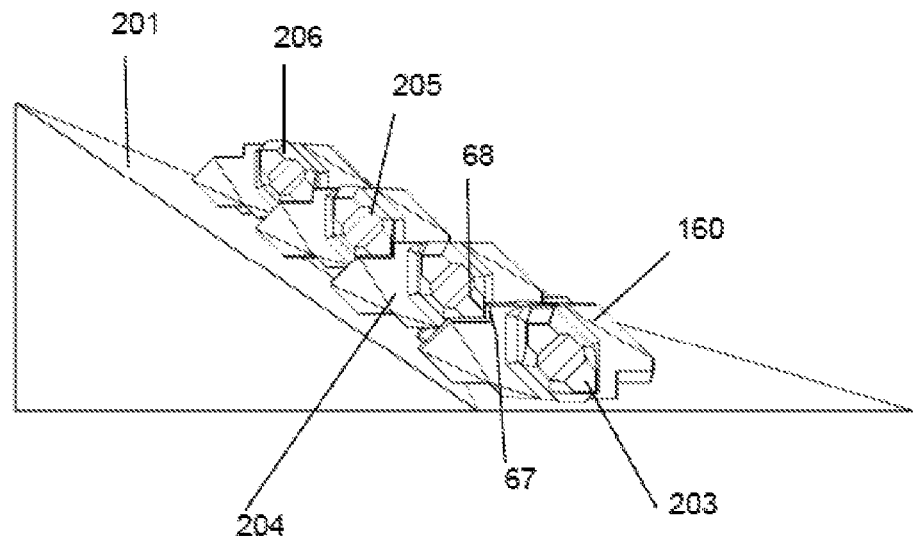
FIG. 21 shows a side view of the construction in FIG. 20, viewed along arrow XXI.
Figure 23:
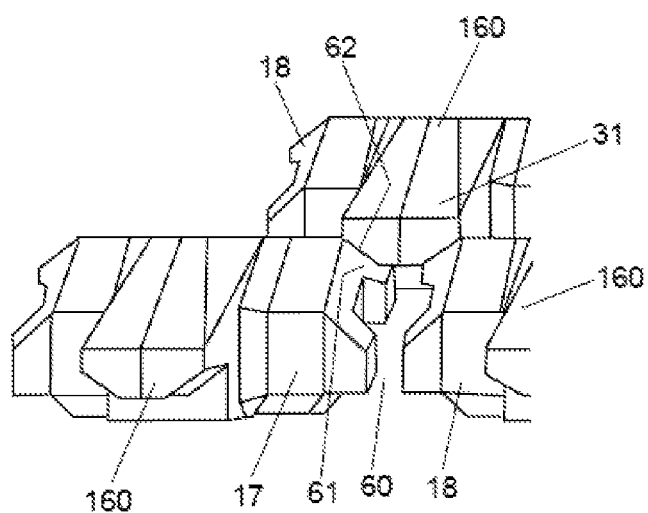
FIG. 23 shows an enlarged detail of FIG. 20.
Figure 22:
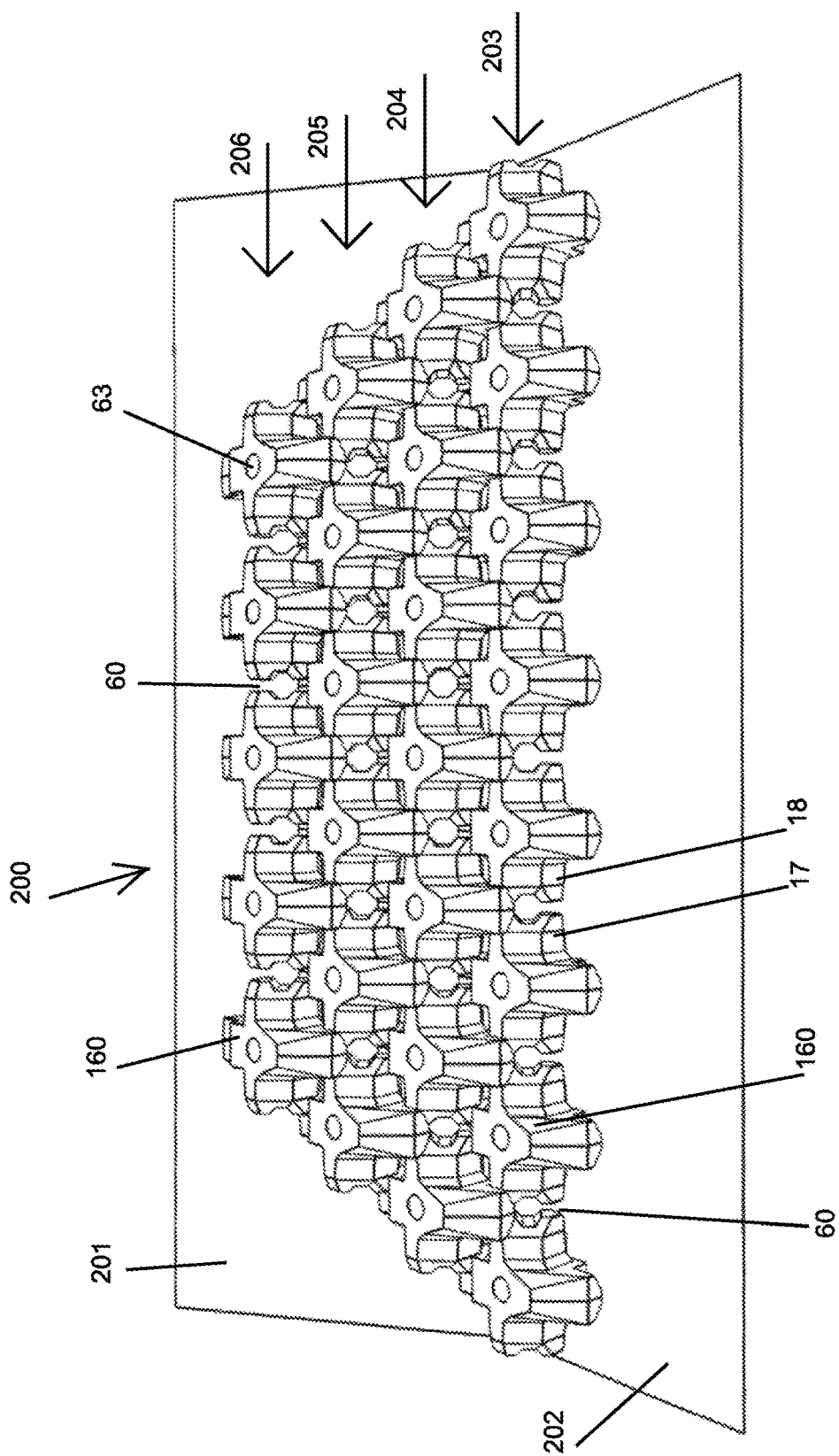
FIG. 22 shows a perspective view of the construction in FIG. 20, viewed at a slant from top to bottom.

FIGS. 1a and 1b show a first cover element 100 according to the first aspect of the invention. FIGS. 2a and 2b show a second cover element 110 according to the first aspect of the invention, FIGS. 3a and 3b show a third cover element 120 according to the first aspect of the invention, FIGS. 4a and 4b show a fourth cover element 130 according to the first aspect of the invention and FIGS. 5a and 5b show a fifth cover element 140 according to the first aspect of the invention. FIG. 6 shows the second aspect of the invention by means of the fifth cover element of FIG. 5. FIGS. 7-12 shows a sixth cover element in which, besides the first aspect of the invention, also the third, fourth and fifth aspects of the invention are realized. FIG. 13 shows a detail of FIG. 6, however the fifth cover element has been replaced by the sixth cover element. FIGS. 14-19 show a seventh cover element according to the invention in which, besides the first, third, fourth, fifth and sixth aspect of the invention, also the sixth and seventh aspects of the invention are realized. Although FIGS. 1-6 do not show the details of a cover element according to the third, fourth and/or fifth aspect of the invention, it will be obvious that what is set forth here in connection with FIGS. 1-6 also holds, mutatis mutandis, for the cover element according to the first, third, fourth and/or fifth aspect of the invention that is shown in FIGS. 7-13, as well as for the cover element according to the first, third, fourth, fifth, sixth and/or seventh aspect of the invention that is shown in FIGS. 14-19. Moreover, what is set forth here in connection with FIGS. 7-13 also holds, mutatis mutandis, for the cover element according to the first, third, fourth, fifth, sixth and/or seventh aspect of the invention that is shown in according to the first, third, fourth, fifth, sixth and/or seventh aspect of the invention that is shown in FIGS. 14-19.

Figure 7:
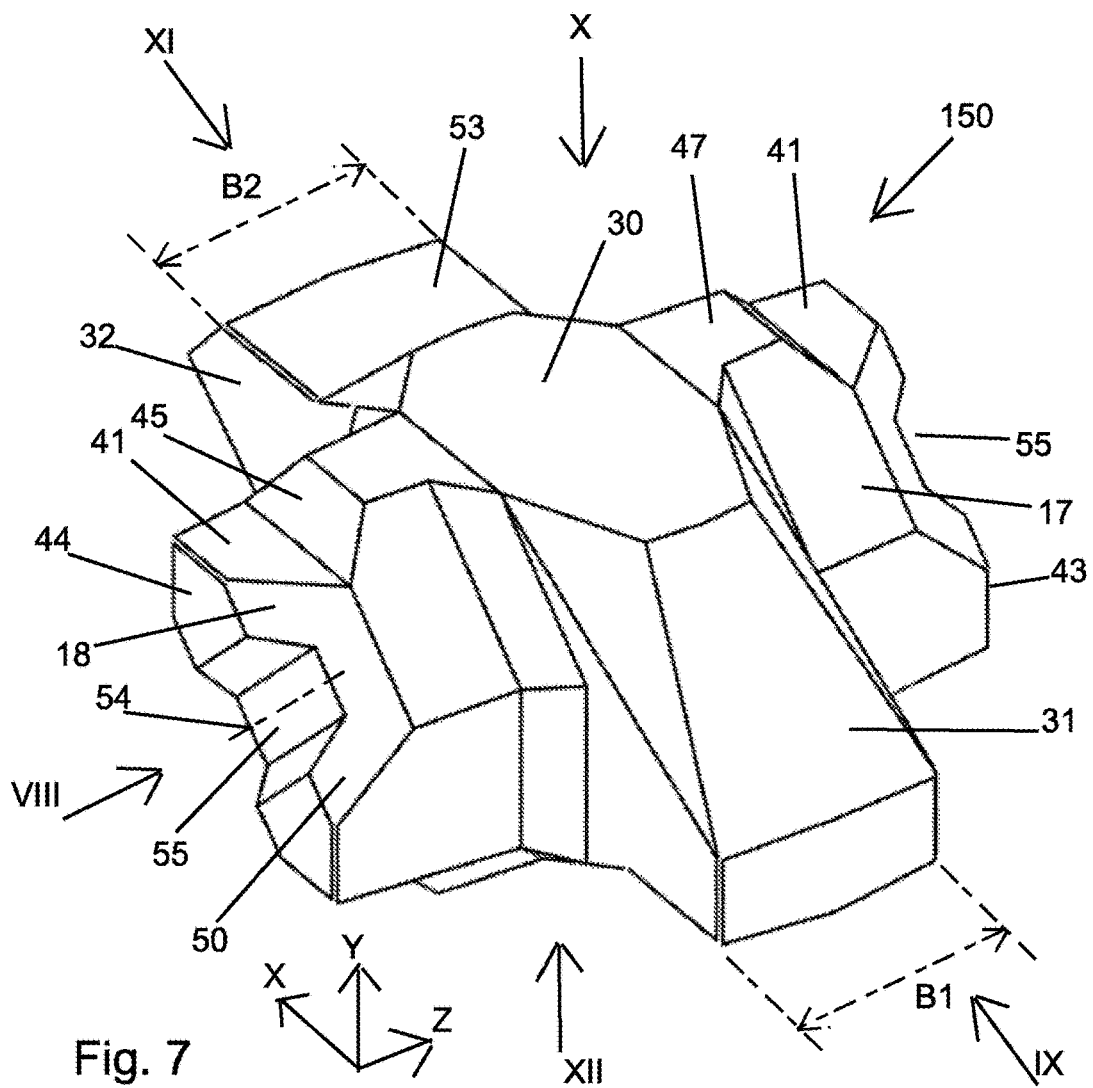
FIG. 7 shows a perspective view of the sixth cover element according to the first, third, fourth and fifth aspect of the invention.

Although the first, second, third, fourth, fifth, sixth and seventh cover element according to the invention are shown in FIGS. 1-23 with a different reference number in each case, the same reference numbers and reference symbols are used for all other corresponding items in all the figures. Specifically, it is pointed out here that many reference numbers are shown in FIGS. 1a, 1b and 7 for better understanding of the concepts used in this application. Many of these reference numbers/signs are not shown again in each case in FIGS. 2-23 in order to keep these figures clear and comprehensible.

Referring in particular to FIGS. 1a and 1b, the cover element 100, 110, 120, 130, 140, 150 and 160 according to the depicted embodiments of the invention is constructed from a plate portion 16 with a transverse nose 17, 18 standing out from the plate portion on either side. If one imagines a system of orthogonal axes X, Y and Z, where the x-axis X and the y-axis Y define an xy-plane, and the xy-plane is positioned such that it extends in the direction in which the plate portion 16 extends, then the noses 17, 18 project from the plate portion 16 in the direction of the z-axis Z. Moreover, this plate portion 16, viewed in the direction of the z-axis Z, has a thickness T. The plate portion 16 and the noses 17, 18 together form a whole. The noses 17 and 18 are fixed to the plate portion 16. The noses 17, 18 in particular form an integral whole with the plate portion 16.

Given that, according to the depicted embodiments of the invention, the cover element 100, 110, 120, 130, 140, 150, 160 will generally be made of concrete, possibly reinforced concrete, it will be obvious that a cover element according to the invention will be poured into a form in one go as a single part. However, in event of reinforcing wires being used in the concrete, it is also conceivable for a cover element according to the invention to be poured from concrete in successive steps, in each successive step forming a section of the cover element. Thus, for example, at first the plate portion 16 may be poured with reinforcement wires projecting at the location of the noses 17 and 18, after which in a second step reinforcement wires for the noses 17 and 18 can be put in place and connected to the reinforcement wires projecting from the plate portion 16 and then pour the concrete for the noses 17 and 18. This is to illustrate how a cover element according to the invention will usually be produced. In itself, it is described in the prior art how a cover element can be made from concrete, see for example FIG. 8 of WO 2004/009910.

For a closer description of the form of the cover element, in particular the form of the plate portion 16, it is assumed in this application that the plate portion 16 is to be imagined as being formed from an imaginary quadrangular plate 1. In FIG. 1a, the quadrangular plate 1 is a square, just as in FIGS. 3a, 4a and 5a, but the quadrangular plate may also have the form of a trapezium or the form of a parallelogram. In the event that the plate 1 has the form of a parallelogram, this may be for example a square form, as shown in FIGS. 1, 3, 4, 5 and 7-12, or a rhomboidal form or a rectangular form. A plate 1 with a rectangular form, with short sides edges 9, 11 and long sides edges 8, 10, is shown for example in FIG. 2a.

Referring to FIGS. 1-5 and 7-12, the initial imaginary plate 1 has a first plate diagonal 2 and a second plate diagonal 3 and the plate 1 is bounded in the xy-plane by four imaginary plate corners 4, 5, 6, 7 and four imaginary plate edges 8, 9, 10, 11. The first plate diagonal 2 extends from the imaginary plate corner 4 to the imaginary plate corner 6 and runs parallel with the y-axis. The second plate diagonal 3 extends from the imaginary plate corner 5 to the imaginary plate corner 7 and runs parallel with the x-axis. The imaginary plate edge 8 extends from the imaginary plate corner 4 to the imaginary plate corner 7, the imaginary plate edge 9 extends from the imaginary plate corner 4 to the imaginary plate corner 5, the imaginary plate edge 10 extends from the imaginary plate corner 5 to the imaginary plate corner 6, and the imaginary plate edge 11 extends from the imaginary plate corner 6 to the imaginary plate corner 7. Now, starting from this initial imaginary plate 1, the form of the plate portion 16 from FIGS. 1-5 as well as FIGS. 7-12 and FIGS. 14-19 can be obtained:

by incising two opposite lying imaginary plate edges 8, 10 approximately in the middle to form a plate recess 14, 15, which plate recesses 14, 15 are in each case approximately trapezoidal in shape in the illustrated cover elements 100, 110, 120, 130, 140, 150 and 160;

optionally, by also incising the other two oppositely situated plate edges 9, 11 approximately in the middle to form a plate recess 19, 20, which plate recesses may also in each case in each case approximately trapezoidal in shape in the illustrated cover elements 100, 110, 120, 130, 140, 150 and 160; and by cutting off both of the imaginary corners 4, 6 situated on the first plate diagonal 2 along a first secant 22, wherein the first secant 22 in each case crosswise intersects the imaginary plate edges bordering the respective cut-off corner; and optionally, by cutting off one of the corners situated on the second plate diagonal along a second secant 23 (FIG. 5a) which on the one hand intersects one of the first secants 22 and on the other hand intersects an imaginary plate edge 11 which borders on the corner 7 cut off along the second secant 23.

In the cover element from FIG. 3, none of the optional possibilities sketched out above have been realized, that is, only the opposite imaginary plate edges 8 and 10 are incised without the opposite plate edges 9 and 11 being incised, and none of the corners situated on the second plate diagonal 3 have been cut off along said second secant. In the embodiments from FIG. 5, both of the optional possibilities sketched out above have been realized, namely, the cutting off along a second secant 23 of the plate corner 7 situated on the second plate diagonal 3, on the one hand, and the providing of the extra plate recess 19 and 20, on the other hand. The configuration of the embodiment from FIGS. 7-12 and of the embodiment from FIGS. 14-19 is a further development of the configuration of the embodiment from FIG. 5.

The cover element according to the first aspect of the invention as well as that according to the third, fourth, fifth, sixth and seventh aspect of the invention may also be described as a central section 30 with protrusions in the form of several legs 31, 32, and 33, and two noses 17, 18. The legs 31, 32, 32 here extend in a plane, such as the xy-plane of an imaginary orthogonal xyz system. The two noses 17, 18 project from the central section 30 in opposite directions with respect to each other (such as in the direction of the z-axis of an imaginary xyz system) and are at right angles to the legs 31, 32 and 33 (or transversely to the xy-plane). One may speak of 3 legs, but also of 2 legs 31, 32, as is shown in FIGS. 1-5, 7-12 and 14-19. As for the legs 31, 32 in FIGS. 1-5, 7-12, and 14-19, it is noted that these correspond to the first corner portion 24, or the second corner portion 25, respectively, as is indicated in FIGS. 1-5.

For all cover elements according to the first, third, fourth, fifth, sixth and seventh aspects of the invention, it holds that the final plate portion 16 measured along the first plate diagonal 2 has a first dimension D1 and measured along the second plate diagonal 3 a second dimension D2, where the first dimension D1 is smaller than the second dimension D2.

As mentioned, said method of forming the plate portion 16 is that this should be imagined as being formed from an initial quadrangular plate which—briefly put—is incised at plate edges to form plate recesses and is cut off at one or more corners. Although it is conceivable for the initial imaginary quadrangular plate 1 to be a genuine concrete plate with thickness T, which is incised in the aforementioned manner at plate edges and has one or more corners cut off, it will be the practice, as previously indicated, for the cover element according to the invention to be poured directly in said form or otherwise formed directly in said form in another way. It may be conceivable to form the cover element according to the invention such that the plate portion 16 and/or the noses 17, 18 are hollow, but in general the plate portion 16 and the noses 17, 18 are solid in configuration—possibly except for plate recesses according to the fourth aspect and/or a passageway according to the sixth aspect.

Before proceeding further with the description of the invention, several basic dimensions for a cover element according to the first, second, third, fourth, fifth, sixth and seventh aspect of the invention will be given as a more detailed indication:

D2: 1-2 m, such as 1.8 m;

D1: 35-65% of the length of D2, such as 40% to 50% of the length of D2;

T: 20-30% of D2;

H: 25-40% of dimension D2; wherein H is the height of the nose 17, 18 viewed in the direction of the z-axis from the plate portion 16;

T is equal or approximately equal to H;

A: 10-15% of D2; wherein A is the depth of an imaginary plate recess measured perpendicular to the corresponding plate edge;

B: 20-25% of D2; wherein B, in relation to an imaginary plate recess, is the thickness of the nose measured in the same direction as the depth A of that imaginary plate recess;

C: 35-40% of D2; wherein C is the width of the imaginary plate recess measured on and along the corresponding imaginary plate edge;

E: 20-25% of D2; wherein E, in relation to an imaginary plate recess, is the width of the nose measured in the same direction as the width C of that imaginary plate recess;

F: 15-20% of D2; wherein F is the width of a plate recess, measured at the bottom of that plate recess and parallel with the corresponding plate edge;

The just mentioned dimensions are simply for better illustration of dimensions indicative of a cover element according to the invention, as are found in practice. These indicative dimensions relate to the embodiments from FIGS. 1, 2, 3 and 4. As a result of the cutting off of the corner 7, the dimension D2 will be shorter in the embodiments from FIG. 5, FIGS. 7-12 and FIGS. 14-19, which results in the adjusting of all percentage proportions as indicated above. Given that the degree of being shorter is dictated by the secant 23 and this overlaps with the bottom of the plate recess 14 having a depth A, these can all be converted. The starting point will be that the dimensions of the imaginary quadrangular plate of FIG. 5a are equal to those of the quadrangular plate 1 of FIG. 1a (the same holds for the embodiment from FIGS. 7-12 and the embodiment from FIGS. 14-19).

Although the plate recesses 14, 15 and 19, 20 may also have a different shape, in all the embodiments of FIGS. 1-5, 7-12 and 14-19 they are substantially trapezoidal with the longest side of the trapezium located on the corresponding imaginary plate edge. Referring for example to FIG. 4a, it is clear that the two or four trapezoidal incisions may be unequal to each other. Referring to FIGS. 1a and 1b, the trapezoidal plate recesses in the depicted cover elements have two parallel sides and two slanting sides. Of the two parallel sides, the long side has a length B and the short side a length F. The short side with length F forms the bottom of the trapezoidal plate recess, as it were. The trapezoidal plate recess has a "height" A, which determines the depth of the plate recess.

The cover elements according to the invention that are shown in FIGS. 1-5, 7-12 and 14-19 are all based on prior-art cover elements for a breakwater or jetty construction:

The cover element of FIGS. 1a and 1b is based on the cover element which is known for example from FIGS. 3-5 of WO-2004/009910. Starting from FIGS. 3-5 of WO-2004/009910, two opposite, pointed protrusions 4 are removed in order to arrive at the cover element from FIGS. 1a and 1b of this application.

The cover element from FIGS. 2a and 2b is likewise based on the cover element known from FIGS. 3-5 of WO2004/009910. The cover element from FIGS. 3-5 of WO2004/009910, based on a square base, is as it were stretched into an elongated rectangular base and once again two opposite, pointed protrusions 4 are removed in order to arrive at the cover element from FIGS. 2a and 2b of this application.

The cover element from FIGS. 3a and 3b of this application is based on the cover element known for example from FIGS. 1-3 of U.S. Pat. No. 3,614,866. Starting from FIGS. 1-3 of U.S. Pat. No. 3,614,866, one of the protruding pieces 2a and the diametrically opposite protruding piece 4a are removed in order to arrive at the cover element from FIGS. 3a and 3b of this application.

The cover element from FIGS. 4a and 4b of this application is based on the cover element shown for example in FIG. 1 of EP-1.165.894. From this cover element from FIG. 1 of EP-1.165.894, the upper left piece and the bottom right piece are so to speak left out in order to arrive at the cover element 130 from FIGS. 4a and 4b of this application. It is noted that FIGS. 4a and 4b of this application show only one of the two noses, namely, nose 17. Nose 18 cannot be seen in this FIGS. 4a and 4b. With the xy-plane as a mirror image plane, nose 18 is the mirror image of nose 17.

The cover element 140 from FIGS. 5a and 5b of this application is based on the same cover element as is the cover element 100 from FIGS. 1a and 1b of this application. Starting from the cover element as depicted in FIGS. 1a and 1b of this application, yet another section of the upper left corner 7 has been left out. It is noted that FIGS. 5a and 5b of this application show only one of the two noses, namely, nose 17. Nose 18 cannot be seen in this FIGS. 5a and 5b. With the xy-plane as a mirror image plane, nose 18 is the mirror image of nose 17.

The cover element 150 from FIGS. 7-12 of this application is based on the cover element 140 from FIGS. 5a and 5b. The cover element 150 is, with the cover element 140 as starting point, a further development in which in particular the configuration of the noses is further adapted for the third, fourth and fifth aspect of the invention.

The cover element 160 from FIGS. 14-19 of this application is based on the cover element 140 from FIGS. 5a and 5b, or if you will the cover element from FIGS. 7-12. The cover element 160, considered with respect to the cover element 150, is a further development wherein the configuration of the noses and first and second leg has been adapted for a further development of the third aspect, the configuration of the first and second leg has been adapted for the seventh aspect, and the configuration of the central section has been adapted for the sixth aspect.

In the following, the idea behind the present invention shall be explained in more detail.

Cover elements, such as are known from WO2004/009910, have a very specific configuration which, in connection with a plurality of other similar cover elements, can provide a very stable cover of a breakwater or slope. This specific configuration consists of an X-shaped or H-shaped base section with noses projecting on either side from the X/H-shape, from the centre of the X/H. The legs of the X/H-shaped base section and the noses provide six protrusions in total. Now, when a plurality of such cover elements is placed on a breakwater or slope, these protrusions engage with each other (known as interlinking) and an anchoring in the ground takes place by legs and/or noses pushed into it. In this way, a very stable layer of cover elements is obtained. The mutual interlinking and anchoring in the ground ensure that the cover elements lie firmly in place. Because the necessary free spaces occur between the cover elements, waves can make it through between the cover elements, strike against the inside, and thus be efficiently broken.

Now, the applicant has come to the insight that, when one or two diagonally opposite legs of the X-shaped or H-shaped base section are omitted—according to the first aspect of the invention—the interlinking of neighbouring cover elements and anchoring of cover elements in the ground is no longer possible, yet by means of a plurality of cover elements according to the invention a very stable cover can still be realized by a breakwater/jetty construction. The cover realized with cover elements according to the invention still affords many openings between which the water can be broken. The great benefits from the cover element known in the prior art may thus still be realized. Moreover, however, the cover element according to the invention has the advantage that the consumption of material, i.e., the required quantity of concrete, is significantly less and the cover realized—according to the second aspect of the invention—can be laid in a very regular pattern, whereas this pattern according to the prior art is much less regular. It is easier to lay a cover with cover elements according to the invention than to lay a cover with comparable, known cover elements. Interlinking of neighbouring cover elements can be introduced once more by means of the seventh aspect of the invention and/or other embodiments of the third aspect of the invention.

A further significant saving of material—i.e., concrete—appears to be possible by removing a further section of a third arm of the former X-shaped base section. This provides a substantial savings in material without this significantly compromising the breakwater/jetty capability of the cover formed with such a cover element.

Although the cover element according to the invention can be laid down in an irregular or even random pattern on the incline of, for example, a breakwater or slope, the cover element according to the invention—according to the second aspect of the invention—can be laid down very efficiently in a regular pattern, as is illustrated in more detail in FIGS. 6, 13 and 20-23. Laid down in such a pattern, many interstices remain between the cover elements according to the invention. These interstices provide, on the one hand, a breakwater or jetty effect and on the other hand ensure that the quantity of material needed—especially concrete—is relatively quite low.

FIG. 6 very schematically shows a slope 200 with an incline 201 which terminates in a substantially horizontal (in this example) foot zone 202 at the lower side. On the slope 200, in this example, there are laid four rows 203, 204, 205 and 206 of cover elements 140, for example. In each row 203, 204, 205, 206, the noses 17, 18 of adjacent cover elements 140 lie on the same line. The noses 17, 18 here may lie against each other but also, as shown, at a certain distance from each other. The rows 203, 204, 205 and 206 here lie above one another at an angle, along the incline of the slope. In each case, an upper row is supported against a lower row. Thus, the cover elements from row 204 are supported on the cover elements from row 203, the cover elements from row 205 are supported on the cover elements from row 204 and the cover elements from row 206 are supported on the cover elements from row 205.

As can be seen in FIG. 6, all the cover elements 140 lie approximately horizontal in each case with the second plate diagonal 3.

Although a different placement of rows of cover elements is also possible, the cover elements from FIG. 6, FIG. 13 and FIGS. 20-23 are advantageously placed in a staggered pattern. The cover elements from an upper row are supported in each case with a first corner part 24 or first leg 31 against the noses 17 and 18 of two adjacent cover elements 140, 150, 160 from a lower row. The first corner part 24 or the first leg 31 of the cover element from the row lying above is thus supported, as it were, by one half on the nose 17 of the one cover element 140, 150, 160 from the lower row and by the other half on the nose 18 of another cover element 140, 150, 160 from the lower row. The noses 18 and 17 of the cover element from the higher row, in turn, are supported in each case on a second corner part 25 or second leg 32, laid on the second plate diagonal 3, of a cover element from the lower situated row. The one nose 18 of a cover element from the higher row is thus supported on the second corner part 25 or the second leg 32 of one cover element 140, 150, 160 from the lower row, while the other nose 17 of that cover element from the higher row is supported on a second corner part 25 or the second leg 32 of another cover element 140, 150, 160 from the lower situated row. Thus, in each case a cover element from a higher row is carried by two cover elements from the lower row, while the two cover elements from the lower row are staggered with respect to the cover element from the higher row.

Because the cover elements 140, 150, 160 in the placement as indicated in FIG. 6, FIG. 13 and FIGS. 20-23 no longer have any protruding part at the bottom side, the bottom side of cover elements 140, 150, 160 lying along the incline 201 of the slope will lie floating, as it were, and this cover element 140, 150, 160 will press primarily with the second corner part 25 or the second leg 32 against the incline 201. Due to the weight of cover elements from the upper rows, the second corner part 25 or the second leg 32 of lower rows will be firmly pressed into the incline 201, thus becoming anchored, and preventing any sliding of that cover element 140, 150, 160 downward along the incline 201.

As is seen in FIG. 6, FIG. 13 and FIGS. 20-23, many interstices remain between the cover elements 140, 150, 160 and free spaces also remain beneath the cover elements, in which wave action of water acting on the slope can be broken.

Although the application with the slope in FIG. 6 is shown by means of cover elements 140 from FIG. 5, it will be clear that the cover elements 100, 110, 120 or 130 can also be used here or—as shown in FIG. 13 and FIGS. 20-23—the cover elements 150 or 160. Because in the cover elements 140, 150, 160 of FIG. 5, FIGS. 7-12 and FIGS. 15-19, respectively, the corner piece 7 is also partly cut off (in other words, shortened), a substantial quantity of concrete can still be saved, while the breakwater properties of such a slope are still preserved.

FIGS. 7-12 and FIGS. 14-19 show different views of a sixth cover element and seventh cover element according to the invention, respectively.

According to the third aspect of the invention, each nose 17, 18 is provided with an upper support surface 41 and lower support surface 42. These support surfaces 41 and 42 extend in parallel with the zx-plane. The length U4—see FIG. 9—of the upper support surface 41 in the z-direction is shorter than 50% of the width B1—see FIG. 7—of the first leg 31. The length U5—see FIG. 9—of the lower support surface 42 in the z-direction is shorter than 50% of the width B2—see FIG. 7—of the first leg 32. Moreover, according to another embodiment of the third aspect of the invention, each nose 17, 18 is provided on the top side with an upper guide surface 45 which is slanted relative to the zx-plane. In a similar manner, each nose 17, 18 at the bottom side is provided with a lower guide surface 46 which is slanted relative to the zx-plane. The guide surfaces 45, 46 guide the cover elements 150 during their laying on an incline such that the lower and upper legs come to lie precisely against the support surfaces 41 and 42. According to another further embodiment of the third aspect of the invention, each nose 17, 18 is provided with an upper spacer 47 at the top side. In a similar manner, each nose 17, 18 is provided with a lower spacer 48 at the bottom side. The spacers 47, 48 provide a spacing between the central section 30 and the support surfaces 41, 42.

According to a further embodiment of the third aspect of the invention as shown in FIGS. 14-19, the upper support surface 41 and upper guide surface 45 of each nose are merged as a single slanted guide surface 61. In other words, the upper support surface here is a slanted guide surface 61. The lower section of this slanted guide surface 61 will ultimately fulfil the supporting function for a first leg 31 of a higher cover element 160, while the higher section of this slated guide surface 61, when such cover elements 160 are placed on an incline, will fulfil the guiding function for the first leg 31 of the higher cover element 160. By designing the upper support surface and upper guide surface as a single slanted guide surface 61, one can easily correct for irregularities in the terrain when several of such cover elements 160 are laid as a construction according to the second aspect of the invention on an incline, such as a slope. Namely, the slanted guide/support surface 61 allows the legs 31 of a cover element 160 from a higher row to find their optimum support position on adjacent noses 17, 18 of cover elements 160 in a lower row themselves.

According to yet another embodiment of the cover element 160 according to the third aspect of the invention shown in FIGS. 14-19 and having one such guide surface 61 on the top side of each nose 17, 18, the one slanted guide surface 161, viewed with respect to the xy-plane, has a downward slant, which matches up with an upward slanting position, viewed with respect to the zx-plane, of an upward slant 62 on either side of the bottom side of the first leg 31. By configuring on the one hand the support surface as a slanted guide surface 61 with a downward slant and on the other hand by providing the bottom side of the legs with an upward slant 62, the legs 31 of a higher cover element 160 with their upward slant 62 can slide relatively easily along the downward slant 61 of a nose 17, 18 of a lower cover element 160 during the placement of such cover elements 160 on an incline, such as a slope. The angle of inclination of the slanted guide surface 61, also referred to as the downward slant 61 here, and the angle of inclination of the upward slant may be approximately equal to each other.

According to the fourth aspect of the invention, each nose 17, 18 is provided with a nose recess 55. As is shown in FIGS. 7-13 and FIGS. 14-19, This nose recess 55 can, according to another embodiment, be a depression formed in the free end 43, 44 of the respective nose 17, 18.

Figure 8:
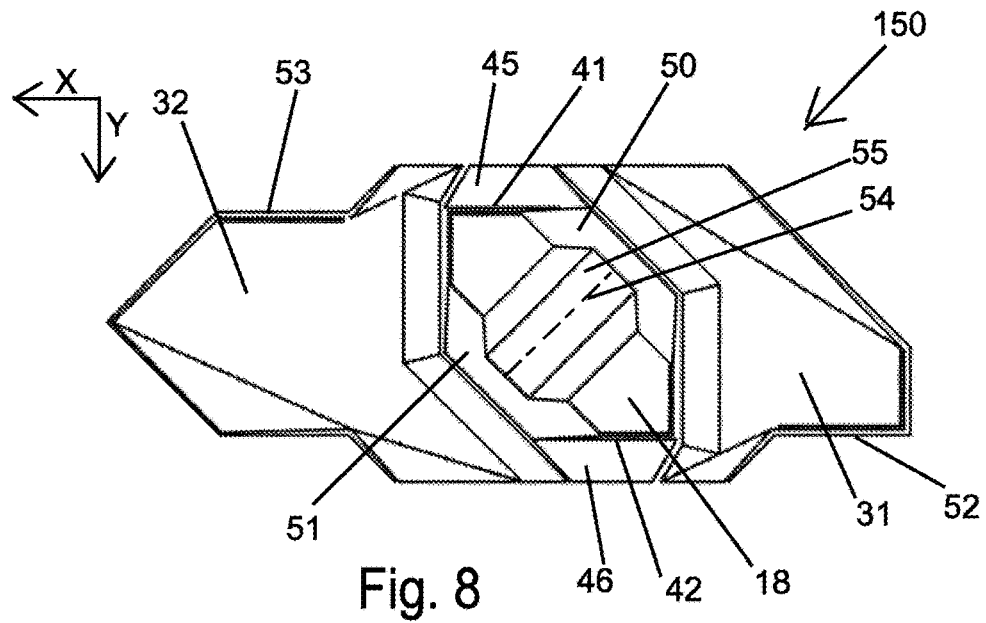
FIG. 8 shows a side view of the sixth cover element from FIG. 7, viewed along arrow VIII from FIG. 7.
Figure 9:
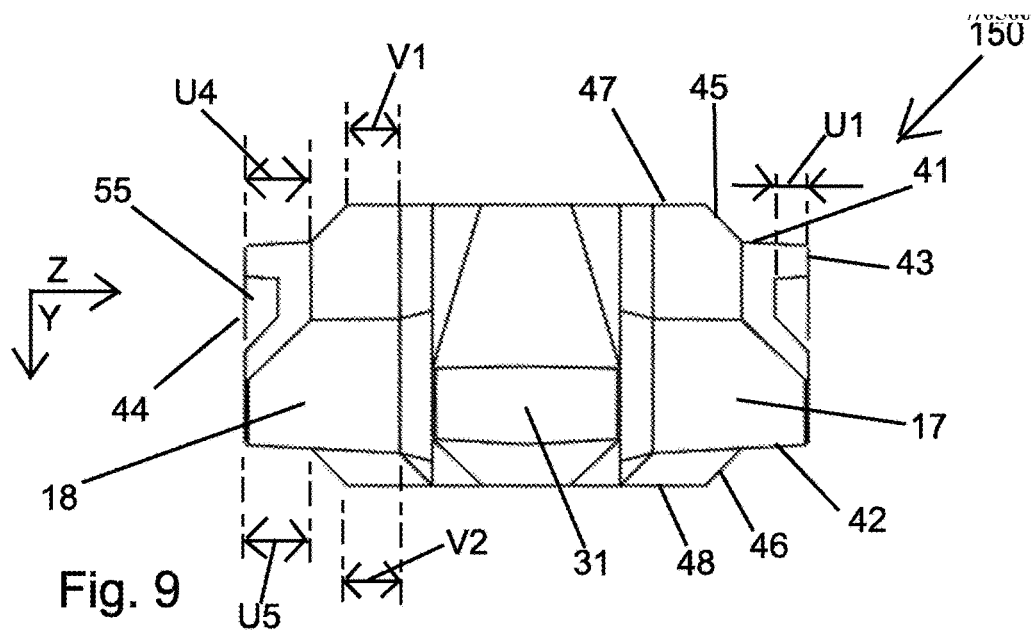
FIG. 9 shows a front view of the sixth cover element from FIG. 7, viewed along arrow IX in FIG. 7.
Figure 10:
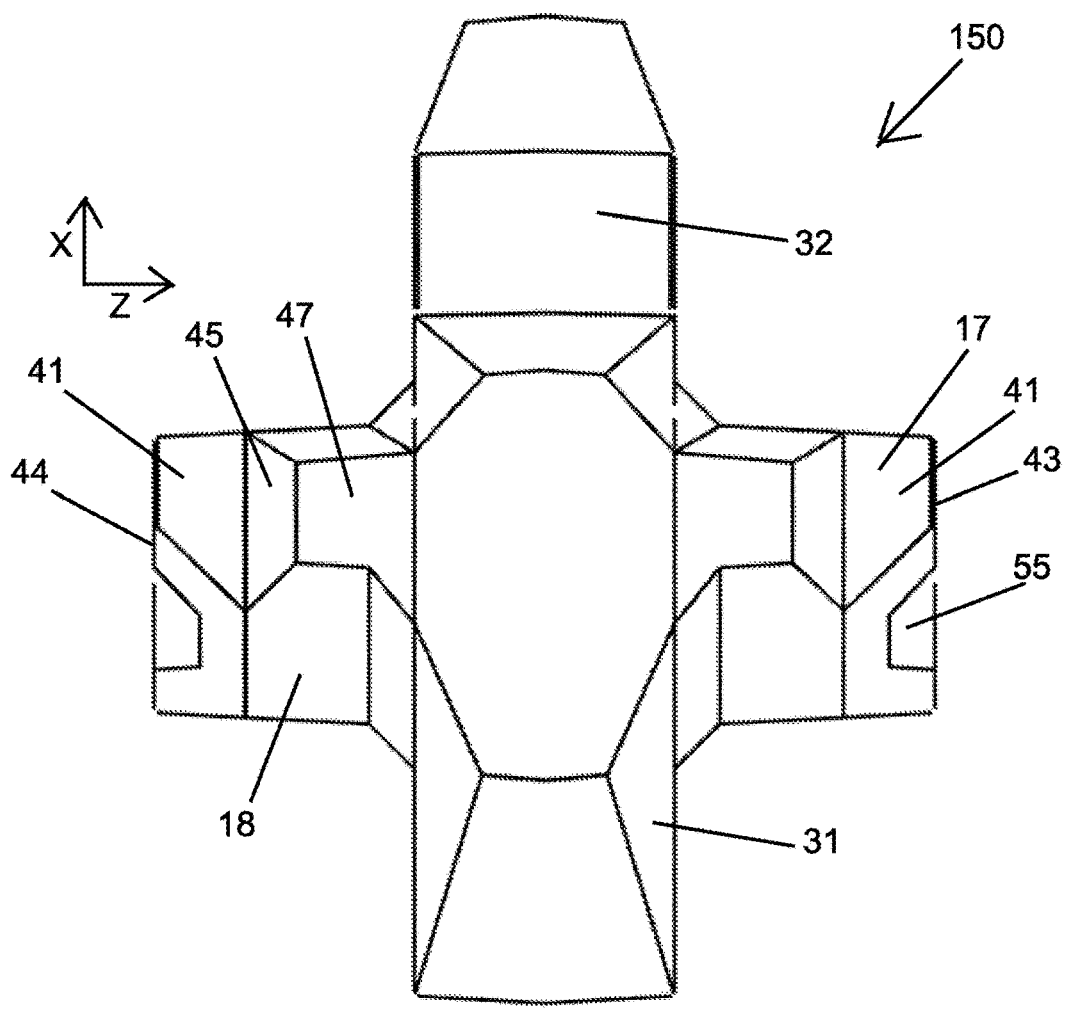
FIG. 10 shows a top view of the sixth cover element from FIG. 7, viewed along arrow X in FIG. 7.
Figure 11:
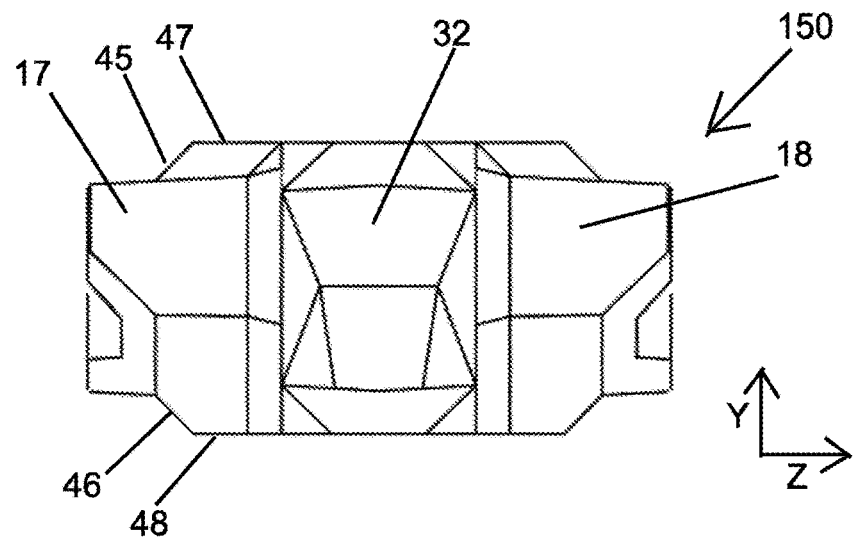
FIG. 11 shows a rear view of the sixth cover element from FIG. 7, viewed along arrow XI in FIG. 7.
Figure 12:
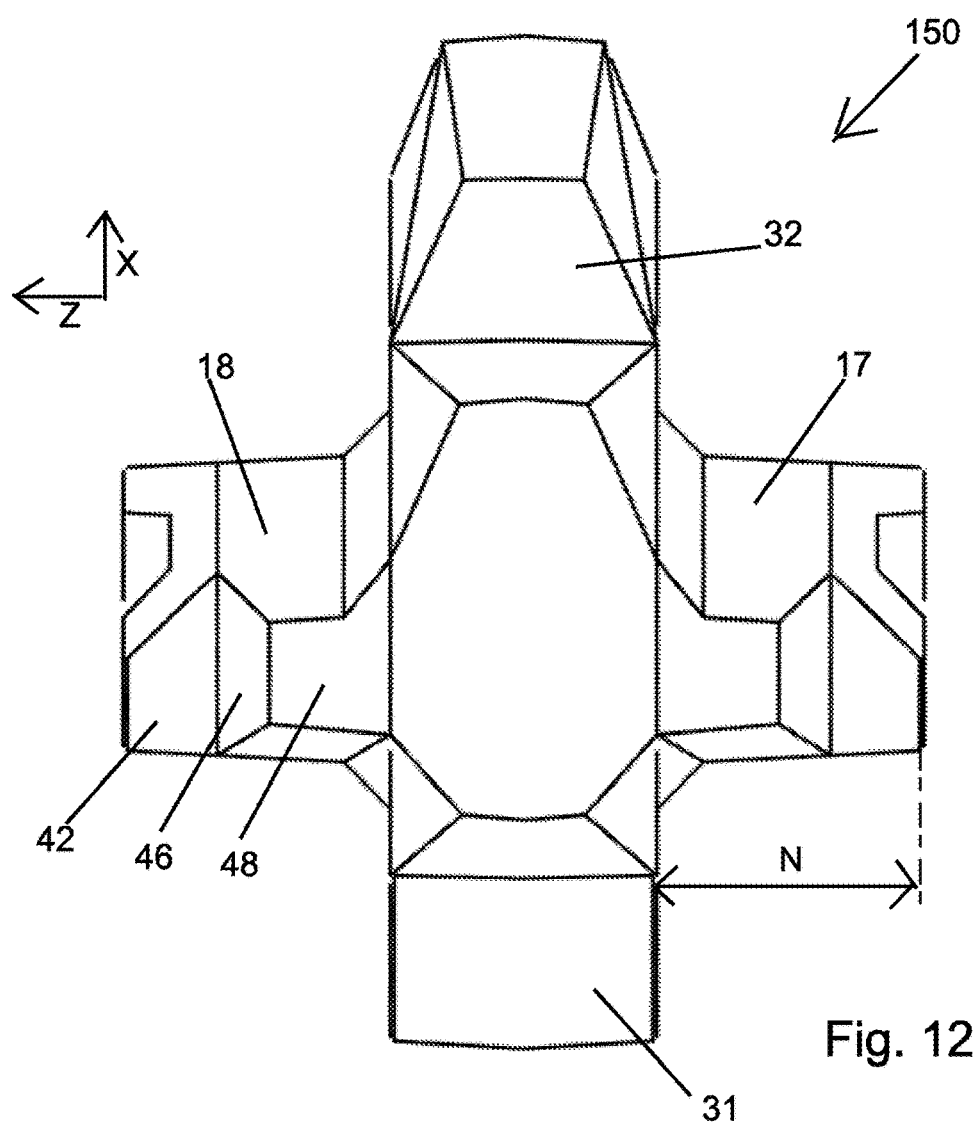
FIG. 12 shows a bottom view of the sixth cover element from FIG. 7, viewed along arrow XII in FIG. 7.

According to the fifth aspect of the invention, on each respective nose 17, 18, the upper support surface 41, 61 and lower support surface 42 are offset with respect to each other in the x-direction. As is shown in FIG. 8 by means of the sixth cover element 150, the upper support surface 41 and the lower support surface 42 overlap each other, viewed in the y-direction, for approximately 50% of their length here. In the embodiment shown in FIG. 15 by means of the seventh cover element 160, the upper support surface 61—which is configured here as a slanted guide surface—and lower support surface 42 only just do not overlap each other in this example.

By using a cover element 150, 160 with upper support surfaces 41, 61 and lower support surfaces 42 according to the third aspect of the invention arranged on a slope in a pattern with cover elements as shown in FIG. 6, in each case an intermediate space 60 can be created between the adjoining noses 17, 18 of cover elements 150 in a row—see FIG. 13 and FIGS. 20, 22 and 23. After all, the length in the z-direction of each support surface 41, 61, 42 is less than 50% of the width of the first and second leg 31, 32, so that the total length of the support surfaces of two adjacent noses 17, 18 facing each other is less than 100% of the width of the first leg 31 or second leg 32, respectively, of a cover element from the higher or lower row of cover elements, respectively. Thus, the quantity of concrete will decrease for each row of cover elements. Moreover, the extra intermediate space 60 which is obtained between the adjoining noses 17, 18 of cover elements 150, 160 in a row provides a passageway through which water from waves working on the slope can pass. Kinetic energy present in these waves will be dissipated during the time of this passage.

By using cover elements 150, 160 on a slope with cover elements arranged in a pattern as shown in FIG. 6, according to the fourth aspect of the invention, with a nose recess 55 in at least one of the noses 17, 18 allows the quantity of concrete needed for each cover element 150, 160 to be reduced. Thus, the quantity of concrete needed for each row of cover elements will also decrease. Moreover, water coming from waves acting on the slope will pass through this nose recess 55. Kinetic energy present in these waves will be dissipated during the time of this passage. This fourth aspect of the invention may also be applied entirely separately from the other aspects of this invention. Furthermore, this fourth aspect of the invention can easily be combined with the third aspect of the invention. In particular, when combining the third aspect of the invention with the fourth aspect of the invention the dissipation of energy of waves acting on the slope is significantly improved when the nose recess 55 according to another embodiment of the fourth aspect of the invention is a depression formed in the free end 43, 44 of the nose 17, 18. This fourth aspect of the invention can also easily be combined with the seventh aspect of the invention and/or the sixth aspect of the invention. The fourth aspect of the invention, whether or not in combination with the third aspect of the invention and/or the seventh aspect of the invention and/or the sixth aspect of the invention, can also be applied very easily without the first aspect of the invention.

By using cover elements 150, 160 on a slope with cover elements arranged in a pattern as shown in FIG. 6, according to the fifth aspect of the invention, with a lower support surface 42 and an upper support surface 41, 61 for each nose, which is offset with respect to the lower support surface 42, the distance—viewed in a direction upward along the slope—between a lower row of cover elements and a row of cover elements situated directly above it can be increased. Thus, viewed at an upward angle along the slope, the quantity of concrete required will decrease. This fifth aspect of the invention can easily be combined with the third aspect of the invention or with the fourth aspect of the invention or with both the third and fourth aspect of the invention. Also, this fifth aspect of the invention, whether or not in combination with the third and/or the fourth aspect of the invention, can also easily be combined with the sixth aspect of the invention or with the seventh aspect of the invention or with both the sixth and seventh aspect of the invention.

By using cover elements 160 for example in a slope with cover elements arranged in a pattern as shown in FIG. 6 and FIGS. 20-23, according to the sixth aspect of the invention, with a passageway 63 through the central section 30, a pressure relief can be realized for the pressure of water which has built up beneath a cover element, for example, by the action of wind or tides. This water under pressure beneath a cover element decreases the pressure by which that cover element rests on the ground, in other words, this water under pressure has a tendency to try to lift the cover element. In this way, the cover element may slide with respect to the ground and/or with respect to other cover elements around it. This is undesirable, because the stability and breakwater and/or jetty action of a construction of several such cover elements may decrease or be seriously affected. Said passageway 63 extends from the bottom side 64 of the cover element 160 up to the top side 65 of the cover element 160 through the central section 30, so that water may rise in this passageway 63 as a pressure is built up beneath the cover element 160. Thus, a relief is realized for the water pressure beneath the cover element 160 and the cover element 160 remains firmly in place.

By using a cover element 160 for a slope with cover elements arranged in a pattern as shown in FIG. 6 and FIGS. 20-23, according to the seventh aspect of the invention, with a preferably substantially vertical side surface part 66, 67 on the top side 53 of the second leg 32 and/or on the bottom side 52 of the first leg 31, cover elements 160 from a higher row are prevented from sliding forward across cover elements 160 of the row situated below. Thus, shifting of the cover elements with respect to the ground and with respect to each other is prevented. Such a shifting is undesirable, because the stability and breakwater and/or jetty action of a construction comprising several such cover elements may decrease or be seriously affected. The side surface part 67 on the top side 53 of the second leg 32 can be realized, for example, by the fact that the top side 53 of the second leg 32, which will extend in general parallel to the xy-plane, but may also run at an angle with respect to the xy-plane, adjoins, at the central section 30, a rear side surface part 67 of the central section 30 which extends in the direction of the zy-plane. When placing cover elements on an incline, the lower edges 68 at the front side of noses 17, 18 of cover elements 160 from the higher row come to lie against said rear side surface part 67 of the central section 30 of a cover element 160 from the lower row, see FIG. 21 where this is illustrated. The side surface part 66 at the bottom side 52 of the first leg 31 may be realized, for example, by the fact that the bottom side 52 of the first leg 31, which will extend in general parallel to the xy-plane, but may also run at an angle with respect to the xy-plane, adjoins, at the central section 30, a front side surface part 66 of the central section 30 which extends in the direction of the zy-plane. When placing cover elements on an incline, the upper edges 69 at the rear side of noses 17, 18 of cover elements 160 from the lower row come to lie against said front side surface part 66 of the central section 30 of a cover element 160 from the higher row.

It will be clear from the foregoing that each of the third aspect of the invention, the fourth aspect of the invention, the fifth aspect of the invention, the sixth aspect of the invention and the seventh aspect of the invention can easily be combined separately or also in any desired combination with the second aspect of the invention. It will also be clear from the foregoing that each of the third aspect of the invention, the fourth aspect of the invention, the fifth aspect of the invention, the sixth aspect of the invention and the seventh aspect of the invention can easily be combined separately or also in any desired combination with the first aspect of the invention. And it will also be clear from the foregoing that each of the third aspect of the invention, the fourth aspect of the invention, the fifth aspect of the invention, the sixth aspect of the invention and the seventh aspect of the invention can easily be combined separately or also in any desired combination with the first and second aspect of the invention.

The invention in all seven aspects and derived embodiments thereof may also be worded as set forth in the following clauses:

1] Cover element (100, 110, 120, 130, 140, 150, 160) of concrete for a breakwater or jetty construction, such as a slope or breakwater,
    wherein an x-axis (X), a y-axis (Y) and a z-axis (Z) define an imaginary system of axes, such as a system of orthogonal axes, and wherein the x-axis (X) and y-axis (Y) define an xy-plane and the z-axis is at right angles to the xy-plane;
    wherein the cover element (100, 110, 120, 130, 140, 150, 160) comprises a plate portion (16) and two noses (17, 18), wherein the plate portion (16) extends in the direction of the xy-plane and has a thickness (T) which extends in the direction of the z-axis (Z), and wherein the two noses (17, 18) project in the direction of the z-axis from the plate portion (16), in a direction opposite each other, and are formed as a single part with the plate portion;
    wherein the plate portion (16) should be imagined as being:
        formed from a quadrangular plate (1) with a first plate diagonal (2) which extends parallel to the y-axis and a second plate diagonal (3) which extends parallel to the x-axis, wherein the plate (1) is bounded in the xy-plane by four plate corners (4, 5, 6, 7) and four plate edges (8, 9, 10, 11);

of which plate (1) two opposite plate edges (8, 10) are each incised at the middle of the respective plate edge to form a plate recess (14, 15); and of which plate (1) at least one of the two corners (4, 6) situated on the first plate diagonal (2) is cut off along a first secant (22) which cuts both imaginary plate edges (8 and 9, or 10 and 11, respectively) bounding the respective corner;

wherein the plate portion (16) has a first dimension (D1) measured along the first plate diagonal (2) and a second dimension (D2) measured along the second plate diagonal (3); and wherein the first dimension (D1) is smaller than the second dimension (D2).

2] Cover element (100, 110, 120, 130, 140, 150, 160) according to clause 1, wherein both corners (4, 6) of the plate (1) situated on the first plate diagonal (2) are cut along a said first secant (22).

3] Cover element (100, 110, 120, 130, 140, 150, 160) according to one of the preceding clauses, wherein said first dimension (D1) amounts 35% to 65% of the length of the first plate diagonal (2).

4] Cover element (100, 110, 120, 130, 140, 150, 160) according to one of the preceding clauses, wherein said first dimension (D1) amounts 40% to 50% of the length of the first plate diagonal (2).

5] Cover element (100, 110, 120, 130, 140, 150, 160) according to one of the preceding clauses, wherein the first secant (22) is straight and it is at an angle ($\alpha$) of 70° to 90°—more particularly at an angle ($\alpha$) of 80° to 90°, such as 90°—with respect to the first plate diagonal (2).

6] Cover element (100, 110, 130, 140, 150, 160) according to one of the preceding clauses, wherein the plate portion (16) is moreover to be imagined as that all four of the plate edges (8, 9, 10, 11) are each incised at the middle of the respective plate edge to form said plate recess (14, 15, 19, 20).

7] Cover element (140, 150, 160) according to clause 6, wherein the plate portion is furthermore imagined in that one of the corners (7) situated on the second plate diagonal (3) is cut along a second secant (23), which on the one hand crosswise intersects one of the first secants (22) and on the other hand crosswise intersects one of the plate edges (8 or 11) which borders on the corner (7) cut along the second secant (23).

8] Cover element (140, 150, 160) according to clause 7, wherein the second secant (23) extends in parallel with one of the plate edges (8) which borders on the corner (7) which is cut along the second secant (23).

9] Cover element (140, 150, 160) according to clause 7 or 8, wherein the second secant (23) touches the deepest point of the plate recess (14) incised in one of the imaginary plate edges (8) that borders on the corner (7) cut along the second secant.

10] Cover element (100, 110, 120, 130, 140, 150, 160) according to one of the preceding clauses, wherein each said respective plate recess (14, 15, 19, 20), viewed in the direction of the xy-plane, has xy-dimensions which, viewed in the direction of the z-axis (Z) and for each plate recess (14, 15, 19, 20) separately, are substantially constant.

11] Cover element (100, 110, 120, 130, 140, 150, 160) according to one of the preceding clauses, wherein said respective plate recess (14, 15, 19, 20) has a depth (A) which, measured from a line perpendicular to the corresponding plate edge (8, 10, 9, 11), is at least 20% of a thickness (B) of the nose (17, 18) measured in the same direction, wherein this thickness (B) of the nose (17, 18) is measured at a distance (V) from the end of the nose (17, 18) which is around 20% of the thickness (T) of the plate (1).

12] Cover element (100, 110, 120, 130, 140, 150, 160) according to clause 11, wherein the depth (A) of said respective plate recess (14, 15, 19, 20) is at least 25%, such as at least 30%, of that thickness (B) of the nose (17, 18) measured in the same direction.

13] Cover element (100, 110, 120, 130, 140, 150, 160) according to one of the preceding clauses, wherein said respective plate recess (14, 15, 19, 20) has a width (C) which, measured on and along the corresponding plate edge (8, 10, 9, 11), is at least 80% of the width (E) of the nose (17, 18) measured in the same direction, wherein this width (E) of the nose (17, 18) is measured at a distance (V) from the end of the nose (17, 18) which is around 20% of the thickness (T) of the plate (1).

14] Cover element (100, 110, 120, 130, 140, 150, 160) according to clause 13, wherein the width (C) of said respective plate recess (14, 15, 19, 20) is at least 95%, such as at least 100%, of the width (E) of the nose (17, 18) measured in the same direction.

15] Cover element (100, 110, 120, 130, 140, 150, 160) according to one of the preceding clauses, wherein the plate recesses (14, 15, 19, 20), viewed in the xy-plane, are trapezoidal with the longest side of the trapezium situated on the corresponding plate edge (8, 10, 9, 11).

16] Cover element (100, 110, 120, 130, 140, 150, 160) according to one of the preceding clauses, wherein the noses (17, 18), viewed in the direction of the z-axis (Z), have a height (H) which is at least 80%, such as 100% or more, of the thickness (T) of the plate portion (16).

17] Cover element (100, 110, 120, 130, 140, 150, 160) according to one of the preceding clauses, wherein the noses (17, 18) are centred on the middle of the imaginary quadrangular plate (1).

18] Cover element (100, 110, 120, 130, 140, 150, 160) according to one of the preceding clauses, wherein the noses (17, 18), viewed in the direction of the xy-plane, have a quadrangular, especially a square, cross sectional shape.

19] Cover element (100, 110, 120, 130, 140, 150, 160) according to clause 18, wherein each corner (21) of the quadrangular cross sectional shape of said nose (17, 18), viewed in a perpendicular projection of the respective nose (17, 18) on the plate (1), lies approximately on an imaginary line which connects the centre point of said plate edge (8, 9, 10, 11) to the centre point of the nose (17, 18).

20] Cover element (100, 110, 120, 130, 140, 150, 160) according to clause 18, wherein each corner (21) of the quadrangular cross sectional shape of said nose (17, 18), viewed in a perpendicular projection of the respective nose (17, 18) on the plate (1), lies approximately on the first or second plate diagonal.

21] Cover element (100, 110, 120, 130, 140, 150, 160) according to one of the preceding clauses, wherein the thickness (T) of the plate portion (16) is approximately 25% to 42%, such as approximately ⅓, of the length of one of the plate edges (8, 9, 10, 11).

22] Cover element (100, 110, 120, 130, 140, 150, 160) according to one of the preceding clauses, wherein the thickness (T) of the plate portion (16) is approximately 20% to 30% of the second dimension (D2) measured along the second plate diagonal (3).

23] Cover element (100, 110, 120, 130, 140, 150, 160) according to one of the preceding clauses, wherein the thickness (T) of the plate portion (16) lies in the range of 30 cm to 150 cm.

24] Cover element (100, 110, 120, 130, 140, 150, 160) according to one of the preceding clauses, wherein one of the plate edges (8, 9, 10, 11) has a length in the range of 90 cm to 450 cm.

25] Cover element (100, 110, 120, 130, 140, 150, 160) according to one of the preceding clauses, wherein the plate edges (8, 9, 10, 11) are approximately equal in length.

26] Cover element (150, 160) according to one of the preceding clauses,
- wherein the z-axis (Z) and the x-axis (X) define a zx-plane;
- wherein the plate portion (1) comprises a central section (30), a first leg (31) and a second leg (32);
- wherein the noses (17, 18) extend from the central section (30) in the direction of the z-axis (Z) in opposite directions with respect to each other, and the first and the second leg (31, 32) extend from the central section (30) in the direction of the x-axis (X) in opposite directions with respect to each other;
- wherein the bottom side (52) of the first leg (31) has a first width (B1) parallel to the z-axis (Z), and the top side (53) of the second leg (32) has a second width (B2) parallel to the z-axis (Z);
- wherein the noses (17, 18) have a top and/or bottom support surface (41, 42), which support surfaces (41, 42) border on the free end (43, 44) of the respective nose (17, 18); and
- wherein, in a direction parallel to the z-axis (Z), the support surfaces (41, 42) have a length (U4, U5), which length (U4, U5) is less than 50% of the width (B1) of the first leg (31) and the width (B2) of the second leg (32), respectively.

27] Cover element (150, 160) of concrete for a breakwater or jetty construction, such as a slope,
- wherein an x-axis (X), a y-axis (Y) and a z-axis (Z) define an imaginary system of orthogonal axes and wherein the z-axis (Z) and the x-axis (X) define a zx-plane;
- wherein the cover element (150, 160) comprises a central section (30), two noses (17, 18), a first leg (31) and a second leg (32), wherein the central section (30), the two noses (17, 18) and the first and second leg (31, 32) are formed as a single part;
- wherein the noses (17, 18) extend from the central section (30) in the direction of the z-axis (Z) in opposite directions with respect to each other, and the first (31) and the second leg (32) extend from the central section (30) in the direction of the x-axis (X) in opposite directions with respect to each other;
- wherein the bottom side (52) of the first leg (31) has a first width (B1) parallel to the z-axis (Z), and the top side (53) of the second leg (32) has a second width (B2) parallel to the z-axis (Z);
- wherein the noses (17, 18) have a top and/or bottom support surface (41, 42), which support surfaces (41, 42) border on the free end (43, 44) of the respective nose (17, 18); and
- wherein, in a direction parallel to the z-axis (Z), the support surfaces (41, 42) have a length (U4, U5), which length (U4, U5) is less than 50% of the width (B1) of the first leg (31) and the width (B2) of the second leg (32), respectively 28] Cover element (150, 160) according to clause 26 or 27, wherein the length (U4, U5) of the upper and/or lower support surface (41, 42) is at most 40%, such as at most 35%, of the width (B1) of the first leg (31), or the width (B2) of the second leg (32), respectively 29] Cover element (150, 160) according to one of clauses 26-28, wherein the length (U4, U5) of the upper and/or lower support surface (41, 42) is at least 15%, such as at least 25%, of the width (B1) of the first leg (31), or the width (B2) of the second leg (32), respectively.

30] Cover element (150, 160) according to one of clauses 26-29, wherein the support surfaces (41, 42) extend substantially parallel to the xy-plane.

31] Cover element (150, 160) according to one of clauses 26-30, wherein the noses (17, 18) have an upper and/or lower guide surface (45, 46) which is slanted with respect to the zx-plane, and wherein the upper and/or lower support surface (41, 42), viewed from the free end (43, 44) of the respective nose (17, 18) and in the direction of the central section (30), borders on the upper or lower guide surface, respectively (45, 46).

32] Cover element (150, 160) according to one of clauses 26-31, wherein the noses (17, 18) have an upper and/or lower spacer (47, 48) which extends in the direction of the zx-plane, and wherein the noses have an upper and/or lower guide surface (45, 61; 46) which is slanted with respect to the zx-plane and which, viewed from the free end (43, 44) of the nose (17, 18) and in the direction of the central section (30), borders on the upper or lower spacer (47, 48), respectively.

33] Cover element (150, 160) according to clause 31, wherein the upper and/or lower spacer (47, 48) has a length (V1 or V2, respectively), measured along the z-axis (Z), which length (V1, V2) is greater than 20%, such as at least 30%, of the width (B1) of the first leg (31), or the width (B2) of the second leg (32), respectively.

34] Cover element (150, 160) according to one of clauses 26-29 or 31-32, wherein each nose (17, 18) has an aforementioned upper support surface which is designed as a guide surface (61) which, viewed from the central section (30) and with respect to the zx-plane, has a downward slant, and wherein the bottom side of the first leg (31) is provided on both sides with an upward slant (62), viewed from the middle of the first leg and with respect to the zx-plane.

35] Cover element (150, 160) according to clause 31, wherein the inclination angle of the downward slant and the inclination angle of the upward slant are the same.

35] Cover element (150, 160) according to one of the preceding clauses 26-34, wherein each nose (17, 18) has a lower and an upper support surface (41, 42).

37] Cover element (150, 160) according to one of the preceding clauses 26-35, wherein the first width (B1) of the first leg (31) is equal to the second width (B2) of the second leg (32).

38] Cover element (150, 160) according to one of the preceding clauses,
- wherein the z-axis (Z) and the x-axis (X) define a zx-plane;
- wherein the noses (17, 18) extend from the central section (30) in the direction of the z-axis (Z) in opposite directions with respect to each other, and the first and the second leg (31, 32) extend from the central section (30) in the direction of the x-axis (X) in opposite directions with respect to each other;
- wherein at least one of the noses (17, 18) has a nose recess (55) which extends from a first longitudinal side (50) of the nose (17, 18) to a second longitudinal side (51) of the nose (17, 18), situated opposite the first longitudinal side (50).

39] Cover element (150, 160) of concrete for a breakwater or jetty construction, such as a slope, wherein an x-axis (X), a y-axis (Y) and a z-axis (Z) define an imaginary system of orthogonal axes and wherein the z-axis (Z) and the x-axis (X) define a zx-plane;

wherein the cover element (150, 160) comprises a central section (30), two noses (17, 18), a first leg (31) and a second leg (32), wherein the central section (30), the two noses (17, 18) and the first and second leg (31, 32) are formed as a single part;

wherein the noses (17, 18) extend from the central section (30) in the direction of the z-axis (Z) in opposite directions with respect to each other, and the first (31) and the second leg (32) extend from the central section (30) in the direction of the x-axis (X) in opposite directions with respect to each other; and wherein at least one of the noses (17, 18) has a nose recess (55) which extends from a first longitudinal side (50) of the nose (17, 18) to a second longitudinal side (51) of the nose (17, 18), situated opposite the first longitudinal side (50).

40] Cover element (150, 160) according to one of clauses 37-39, wherein the nose recess (55) is a depression formed in the free end (43, 44) of the nose (17, 18).

41] Cover element (150, 160) according to one of clauses 37-39, wherein an imaginary connecting line (54) can be drawn between the first longitudinal side (50) and the second longitudinal side (51), through the nose recess (55), wherein this connecting line (54) is at an angle with respect to the zx-plane.

42] Cover element (150, 160) according to one of clauses 37-40, wherein both noses (17, 18) have an aforementioned nose recess (55).

43] Cover element (150, 160) according to one of clauses 37-41, wherein the nose recess (55) has a depth (U1) in the direction of the z-axis (Z), wherein the noses (17, 18), viewed in the direction of the z-axis (Z) and measured from the central section (30) to the free end (43, 44) of the respective nose (17, 18), have a nose length (N), and wherein the depth (U1) of the nose recess (55) is at most 60%, such as at most 40%, of the nose length (N).

44] Cover element (150, 160) according to one of clauses 37-42, wherein the depth (U1) of the nose recess (55) is at least 5%, such as at least 10% of the nose length (N).

45] Cover element (150, 160) according to one of the preceding clauses,
wherein the z-axis (Z) and the x-axis (X) define a zx-plane;
wherein the noses (17, 18) have an upper and a lower support surface (41, 42), which support surfaces (41, 42) extend for the most part parallel to the zx-plane;
wherein the noses (17, 18) extend from the central section in the direction of the z-axis (Z) in opposite directions with respect to each other, and the first and the second leg (31, 32) extend from the central section (30) in the direction of the x-axis (X) in opposite directions with respect to each other; and
wherein the lower support surface (42) is displaced in the direction of the x-axis (X) with respect to the upper support surface (41), and wherein the upper and lower support surface (41, 42) overlap each other at most partly in the direction of the y-axis (Y).

46] Cover element (150, 160) of concrete for a breakwater or jetty construction, such as a slope,
wherein an x-axis (X), a y-axis (Y) and a z-axis (Z) define an imaginary system of orthogonal axes and wherein the z-axis (Z) and the x-axis (X) define a zx-plane;
wherein the cover element (150, 160) comprises a central section (30), two noses (17, 18), a first leg (31) and a second leg (32), wherein the central section (30), the two noses (17, 18) and the first and second leg (31, 32) are formed as a single part;
wherein the noses (17, 18) extend from the central section (30) in the direction of the z-axis (Z) in opposite directions with respect to each other, and the first and the second leg (31, 32) extend from the central section (30) in the direction of the x-axis (X) in opposite directions with respect to each other;
wherein the noses (17, 18) have an upper and a lower support surface (41, 42), which support surfaces (41, 42) extend parallel to the zx-plane;
wherein the lower support surface (42) is displaced in the direction of the x-axis (X) with respect to the upper support surface (41); and
wherein the upper and lower support surface (41, 42) overlap each other at most partly in the direction of the y-axis (Y).

47] Cover element (150, 160) according to one of clauses 44-45, wherein the upper and lower support surface (41, 42) are displaced with respect to each other in the direction of the x-axis such that the lower and upper support surface (41, 42), viewed in the direction of the y-axis, have no overlap with each other.

48] Cover element (150, 160) according to one of clauses 44-46, wherein the upper and lower support surface (41, 42) border on the free end (43, 44) of the nose (17, 18) on which they are provided.

49] Cover element (160) according to one of the preceding clauses,
wherein the plate portion (1) comprises a central section (30), a first leg (31) and a second leg (32);
wherein the noses (17, 18) extend from the central section (30) in the direction of the z-axis (Z) in opposite directions with respect to each other, and the first and the second leg (31, 32) extend from the central section (30) in the direction of the x-axis (X) in opposite directions with respect to each other;
wherein the central section (30) is provided with a passageway (63) extending in the direction of the y-axis (Y) from the bottom side (64) of the cover element (160) to the top side (65) of the cover element (160), which passageway (63) is designed such that water which is located beneath the cover element (160) and which exerts an upward pressure on the cover element (160) can escape via this passageway (63) so as to relieve the cover element (160) of upward pressure.

50] Cover element (160) of concrete for a breakwater or jetty construction, such as a slope,
wherein an x-axis (X), a y-axis (Y) and a z-axis (Z) define an imaginary system of orthogonal axes;
wherein the cover element (160) comprises a central section (30), two noses (17, 18), a first leg (31) and a second leg (32), wherein the central section (30), the two noses (17, 18) and the first and second leg (31, 32) are formed as a single part;
wherein the noses (17, 18) extend from the central section (30) in the direction of the z-axis (Z) in opposite directions with respect to each other, and the second leg (31, 32) extend from the central section (30) in the direction of the x-axis (X), in opposite directions with respect to each other; and
wherein the central section (30) is provided with a passageway (63) extending in the direction of the y-axis (Y) from the bottom side (64) of the cover element (160) to the top side (65) of the cover element (160), which passageway (63) is designed such that water which is located beneath the cover element (160) and which exerts an upward pressure on the cover element (160) can escape via this passageway (63) so as to relieve the cover element (160) of upward pressure.

51] Cover element (160) according to one of the preceding clauses,
- wherein the z-axis (Z) and the x-axis (X) define a zx-plane and the z-axis (Z) and the y-axis (Y) define a zy-plane;
- wherein the plate portion (1) comprises a central section (30), a first leg (31) and a second leg (32);
- wherein the noses (17, 18) extend from the central section (30) in the direction of the z-axis (Z) in opposite directions with respect to each other, and the first and the second leg (31, 32) extend from the central section (30) in the direction of the x-axis (X) in opposite directions with respect to each other;
- wherein:
  - the top side (53) of the second leg (32) extends in the direction of the zx-plane and at the central section (30) adjoins a rear side surface portion (67) of the central section (30) that extends in the direction of the zy-plane,
  - and/or
  - the bottom side (52) of the first leg (31) extends in the direction of the zx-plane and at the central section (30) it adjoins a front side surface portion (66) of the central section (30) that extends in the direction of the zy-plane.

52] Cover element (160) of concrete for a breakwater or jetty construction, such as a slope,
- wherein an x-axis (X), a y-axis (Y) and a z-axis (Z) define an imaginary system of orthogonal axes and wherein the z-axis (Z) and the x-axis (X) define a zx-plane and the z-axis (Z) and the y-axis (Y) define a zy-plane;
- wherein the cover element (160) comprises a central section (30), two noses (17, 18), a first leg (31) and a second leg (32), wherein the central section (30), the two noses (17, 18) and the first and second leg (31, 32) are formed as a single part;
- wherein the noses (17, 18) extend from the central section (30) in the direction of the z-axis (Z) in opposite directions with respect to each other, and the first and the second leg (31, 32) extend from the central section (30) in the direction of the x-axis (X) in opposite directions with respect to each other; and
- wherein:
  - the top side (53) of the second leg (32) extends in the direction of the zx-plane and at the central section (30) adjoins a rear side surface portion (67) of the central section (30) that extends in the direction of the zy-plane,
  - and/or
  - the bottom side (52) of the first leg (31) extends in the direction of the zx-plane and at the central section (30) adjoins a front side surface portion (66) of the central section (30) that extends in the direction of the zy-plane.

53] Cover element (160) according to one of clauses 50-51, wherein said rear side surface portion (67) is substantially at right angles to the top side (53) of the second leg (32).

54] Cover element (160) according to one of clauses 50-52, wherein said front side surface portion (66) is substantially at right angles to the bottom side (52) of the first leg (31).

55] Cover element (150, 160) according to one of clauses 26-53, wherein the cover element (150, 160) moreover comprises a third (33) and a fourth leg (34) which are formed as a single part with the central section (30) and which extend from the central section (30) in the direction of the y-axis (Y) in opposite directions with respect to each other.

56] Cover element (150, 160) according to one of clauses 1-53, wherein the cover element (150, 160) moreover comprises a third leg (33) which is formed as a single part with the central section (30) and which extends from the central section (30) in the direction of the y-axis (Y).

57] A breakwater or jetty construction comprising a plurality of cover elements (100, 110, 120, 130, 140, 150, 160) of the type formed from an X-shaped or H-shaped plate portion (16) with:
- four legs (31, 32, 33, 34) determined by the X-shape or H-shape, two (33, 34) of which lie on a first diagonal (2) of the plate portion (16) and two (31, 32) on a second diagonal (3) of the plate portion (16); and
- with two noses (17, 18) at right angles to the plate portion, projecting in opposite direction from the plate portion,
- wherein at least one of the two legs (33, 34) situated on a first diagonal is removed from the plate portion (16);
- wherein the plurality of cover elements (100, 110, 120, 130, 140, 150, 160) is arranged in horizontal rows (203, 204, 205, 206), lying one above another against a slope (200), with the noses (17, 18) of the adjoining cover elements (100, 110, 120, 130 140, 150, 160) of each row lying on a line and with the second diagonal (3) of each cover element (100, 110, 120, 130 140, 150, 160) being horizontally oriented;
- wherein a first (33) of the legs of the cover elements (100, 110, 120, 130 140, 150, 160) of each row (204, 205, 206) that are situated on the second diagonal (3) are supported on two adjacent noses (17, 18) of adjacent cover elements (100, 110, 120, 130 140, 150, 160) from a lower row (203, 204, 205), while the other (32) of the legs of the cover elements of that row which are situated on the second diagonal is supported against the slope.

58] Breakwater or jetty construction (200) comprising a plurality of cover elements (100, 110, 120, 130, 140, 150, 160) according to one of clauses 1-55.

59] Construction (200) according to clause 57,
- wherein the cover elements (100, 120, 130, 140, 150, 160) are placed in horizontal rows (203, 204, 205, 206) lying one on top of another against the slope (200) with the first plate diagonal (2) substantially vertical;
- wherein the noses (17, 18) of adjacent cover elements (100, 110, 120, 130 140, 150, 160) of each row (203, 204, 205, 206) lie on the same line;
- wherein a first corner portion (24) of a cover element (100, 110, 120, 130 140, 150, 160) from an upper row (204,205, 206) is supported in each case on two adjacent noses (17, 18) of adjacent cover elements (100, 110, 120, 130 140, 150, 160) from a lower row (203, 204, 205), said first corner portion being situated on the second plate diagonal (3); and
- wherein the noses (17, 18) of a cover element (100, 110, 120, 130 140, 150, 160) from an upper row (204,205, 206) are in each case supported on a second corner portion (25) of a cover element (100, 110, 120, 130 140, 150, 160) from a lower row (203, 204, 205), said second corner portion being situated on the second plate diagonal (3).

60] Construction according to clause 58 in combination with at least one of clauses 7-9, wherein the cut corner portion (7) on the second plate diagonal (3) in each case faces away from the slope with the second secant (23) facing upwards.

| List of reference numbers and symbols for the figures | |
|---|---|
| 1 | (Imaginary) plate |
| 2 | First plate diagonal |
| 3 | Second plate diagonal |
| 4 | Plate corner on 1st plate diagonal |
| 5 | Plate corner on 2nd plate diagonal |
| 6 | Plate corner on 1st plate diagonal |
| 7 | Plate corner on 2nd plate diagonal |
| 8 | Plate edge |
| 9 | Plate edge |
| 10 | Plate edge |
| 11 | Plate edge |
| 12 | First flat surface |
| 13 | Second flat surface |
| 14 | Plate recess |
| 15 | Plate recess |
| 16 | Plate portion |
| 17 | Nose |
| 18 | Nose |
| 19 | Plate recess |
| 20 | Plate recess |
| 21 | Corner of nose |
| 22 | First secant |
| 23 | Second secant |
| 24 | First corner portion |
| 25 | Second corner portion |
| 30 | Central section |
| 31 | First leg |
| 32 | Second leg |
| 33 | Third leg |
| 34 | Fourth leg |
| 41 | Top support surface |
| 42 | Bottom support surface |
| 43 | Free end of nose 17 |
| 44 | Free end of nose 18 |
| 45 | Ttop guide surface on nose |
| 46 | Bottom guide surface on nose |
| 47 | Top spacer, nose |
| 48 | Bottom spacer, nose |
| 50 | One lengthwise side of nose |
| 51 | Other lengthwise side of nose |
| 52 | Bottom, first leg |
| 53 | Top, second leg |
| 54 | Connecting line |
| 55 | Recess |
| 60 | Space between noses |
| 61 | Downward slanting guide surface |
| 62 | Upward slant |
| 63 | Passage |
| 64 | Bottom, cover element |
| 65 | Top, cover element |
| 66 | Front abutment/front side surface portion of the central section |
| 67 | Rear bumper/rear side surface Portion of the central section |
| 68 | Bottom edge, front of nose |
| 69 | Top edge, rear of nose |
| 100 | Cover element first embodiment |
| 110 | Cover element second embodiment |
| 120 | Cover element third embodiment |
| 130 | Cover element fourth embodiment |
| 140 | Ccover element fifth embodiment |
| 150 | Cover element sixth embodiment |
| 160 | Cover element seventh embodiment |
| 200 | Slope |
| 201 | Incline |
| 202 | Foot/toe |
| 203 | Bottom row |
| 204 | Middle row |
| 205 | Middle row |
| 206 | Top row |
| A | Depth, plate recess |
| B | Tthickness of nose in direction of depth of plate recess |
| B1 | Width, first leg |
| B2 | Width, second leg |
| C | Width, plate recess |
| D1 | First dimension |
| D2 | Second dimension |
| E | Width, nose |
| F | Width, bottom of plate recess |
| H | Height of the nose |
| N | Nose length |
| T | Thickness, plate portion |
| U1 | Depth, nose recess |
| U4 | Length, top support surface |
| U5 | Length, bottom support surface |
| V | Distance to end of nose |
| V1 | Length, top spacer |
| V2 | Length, bottom spacer |
| α | Angle between first secant and first plate diagonal |
| X | X-axis |
| Y | Y-axis |
| Z | Z-axis |

The invention claimed is:

1. A breakwater or jetty construction comprising:
a plurality of cover elements, each of the cover elements having an x-axis, a y-axis and a z-axis, the axes defining an imaginary system of orthogonal axes, the z-axis and the x-axis defining a horizontal zx-plane, and the x-axis and y-axis defining an xy-plane, each of the cover elements being defined by a central section with protrusions that are:
a first leg and a second leg, the first leg and the second leg extending in the xy-plane, the first leg and the second leg extending from opposite sides of the central section in a direction of the x-axis, and
two noses projecting, in a direction of the z-axis, from the central section in opposite directions with respect to each other,
such that the cover elements each have a form of an X-shaped or H-shaped plate portion having
four plate portion legs determined by the X-shape or H-shape, two of the plate portion legs being situated on a first diagonal of the plate portion and the other two plate portion legs being situated on a second diagonal of the plate portion, the other two plate portion legs defining the first leg and the second leg, and
two plate portion noses at right angles to the plate portion, projecting in opposite directions from the plate portion,
with at least one of the two plate portion legs situated on the first diagonal of the plate portion having been omitted from the plate portion,
wherein each cover element has a first dimension measured along the first diagonal and a second dimension measured along the second diagonal, the first dimension being smaller than the second dimension,
wherein the plurality of cover elements is arranged in horizontal rows, the horizontal rows slanting such that at least one horizontal row is disposed in relation to at least another horizontal row along an incline of the construction, the noses of adjoining ones of the cover elements of each of the rows lying on a line, the x-axis of each of the cover elements being horizontally oriented, said at least one horizontal row defining a higher row and said at least one other horizontal row defining a lower row, and
wherein the cover elements of at least one of the higher rows have the respective first legs supported on two adjacent noses of adjacent cover elements from at least one of the lower rows and have the respective noses supported on the second legs of adjacent cover elements from the lower row, the second legs of the cover elements being supported against the incline, bottom sides of the central sections of the cover elements lying floating above the incline such that the second legs of the cover elements of the lower rows are firmly pressed into the incline due to weight of the cover elements from the upper rows.

2. The construction according to claim 1, wherein the central section, the two noses, the first leg, and the second leg of each cover element are formed as a single part.

3. The construction according to claim 1, wherein both of the two plate portion legs situated on the first diagonal have been omitted.

4. The construction according to claim 1, wherein an upper side of the first leg slants at 45° with respect to the x-axis.

5. The construction according to claim 1, wherein, viewed in the direction of the z-axis, a thickness of the plate portion lies in a range of 30 cm to 150 cm.

6. The construction according to claim 1, wherein the second dimension is 1.27-6.36 m, and the first dimension is 35%-65% of a length of the second dimension.

7. The construction according to claim 1, wherein the bottom side of the first leg has a first width parallel to the z-axis, and the top side of the second leg has a second width parallel to the z-axis, wherein the noses have a top and bottom support surface, the top and bottom support surfaces bordering on the free end of the respective nose, and wherein, in a direction at right angles to the plate portion, the top and bottom support surfaces have a length less than 50% of the width of the first leg and the width of the second leg, respectively.

8. A breakwater or jetty construction comprising:
a plurality of cover elements, each of the cover elements having an x-axis, a y-axis and a z-axis, the axes defining an imaginary system of orthogonal axes, the z-axis and the x-axis defining a horizontal zx-plane, and the x-axis and y-axis defining an xy-plane, each of the cover elements being defined by a central section with protrusions that are:
  a first leg, a second leg, and a third leg, the first, second, and third legs extending in the xy-plane, the first leg and the second leg extending from opposite sides of the central section in a direction of the x-axis, the third leg extending upwards in a direction of the y-axis, and
  two noses projecting, in a direction of the z-axis, from the central section in opposite directions with respect to each other,
  such that the cover elements each have a form of an X-shaped or H-shaped plate portion having
    four plate portion legs determined by the X-shape or H-shape, two of the plate portion legs being situated on a first diagonal of the plate portion and the other two plate portion legs being situated on a second diagonal of the plate portion, the other two plate portion legs defining the first leg and the second leg, and
    two plate portion noses at right angles to the plate portion, projecting in opposite directions from the plate portion, with at least one of the two plate portion legs situated on the first diagonal of the plate portion having been omitted from the plate portion,
wherein each cover element has a first dimension measured along the first diagonal and a second dimension measured along the second diagonal, the first dimension being smaller than the second dimension,
wherein the plurality of cover elements is arranged in horizontal rows, the horizontal rows slanting such that at least one horizontal row is disposed in relation to at least another horizontal row along an incline of the construction, the noses of adjoining ones of the cover elements of each of the rows lying on a line, the x-axis of each of the cover elements being horizontally oriented, said at least one horizontal row defining a higher row and said at least one horizontal row defining a lower row, and
wherein the cover elements of at least one of the higher rows have the respective first legs supported on two adjacent noses of adjacent cover elements from at least one of the lower rows and have the respective noses supported on the second legs of adjacent cover elements from the lower row, the second legs of the cover elements being supported against the incline, bottom sides of the central sections of the cover elements lying floating above the incline such that the second legs of the cover elements of the lower rows are firmly pressed into the incline due to a weight of the cover elements from the upper rows.

9. The construction according to claim 8, wherein the central section, the two noses, the first leg, the second leg, and the third leg of each cover element are formed as a single part.

10. The construction according to claim 8, wherein both of the two plate portion legs situated on the first diagonal have been omitted.

11. The construction according to claim 8, wherein an upper side of the first leg slants at 45° with respect to the x-axis.

12. The construction according to claim 8, wherein, viewed in the direction of the z-axis, a thickness of the plate portion lies in a range of 30 cm to 150 cm.

13. The construction according to claim 8, wherein the second dimension is 1.27-6.36 m, and the first dimension is 35%-65% of a length of the second dimension.

14. The construction according to claim 8, wherein the bottom side of the first leg has a first width parallel to the z-axis, and the top side of the second leg has a second width parallel to the z-axis, wherein the noses have a top support surface and a bottom support surface, the top and bottom support surfaces bordering on a free end of the respective nose, and wherein, in a direction at right angles to the plate portion, the top and bottom support surfaces have a length less than 50% of the width of the first leg and the width of the second leg, respectively.

* * * * *